(12) United States Patent
Nakata et al.

(10) Patent No.: US 11,330,183 B2
(45) Date of Patent: May 10, 2022

(54) SHAKE CORRECTION DEVICE INCLUDING DIELECTRIC ELASTOMER ACTUATOR, DRIVING DEVICE, IMAGING DEVICE, AND ELECTRONIC DEVICE

(71) Applicant: Sony Corporation, Tokyo (JP)

(72) Inventors: Akihiro Nakata, Tokyo (JP); Satoshi Nakamaru, Tokyo (JP); Yoshio Goto, Tokyo (JP); Tomoya Takei, Tokyo (JP); Kazuyuki Ejima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/257,501

(22) PCT Filed: Jul. 1, 2019

(86) PCT No.: PCT/JP2019/026165
§ 371 (c)(1),
(2) Date: Dec. 31, 2020

(87) PCT Pub. No.: WO2020/009071
PCT Pub. Date: Jan. 9, 2020

(65) Prior Publication Data
US 2021/0235018 A1     Jul. 29, 2021

(30) Foreign Application Priority Data

Jul. 4, 2018    (JP) ................................ 2018-127806

(51) Int. Cl.
*H04N 5/228*     (2006.01)
*H04N 5/232*     (2006.01)
(Continued)

(52) U.S. Cl.
CPC ....... *H04N 5/23287* (2013.01); *G02B 27/646* (2013.01); *G03B 5/04* (2013.01); *G03B 2205/0015* (2013.01)

(58) Field of Classification Search
CPC .... H04N 5/23287; G02B 27/646; G03B 5/04; G03B 2205/0015
(Continued)

(56) References Cited

U.S. PATENT DOCUMENTS

2005/0204640 A1*   9/2005   Seo ........................... E04H 3/26
                                                                      52/7
2006/0092514 A1*   5/2006   Koo ..................... G02B 27/646
                                                      359/557
(Continued)

FOREIGN PATENT DOCUMENTS

JP          2006-245642 A     9/2006
JP          2006245642 A   *   9/2006
(Continued)

OTHER PUBLICATIONS

International Search Report dated Oct. 1, 2019 issued in connection with PCT/JP2019/026165.

*Primary Examiner* — Usman A Khan
(74) *Attorney, Agent, or Firm* — K&L Gates LLP

(57) ABSTRACT

A shake correction device including a driven body, a first actuator that is extendable and contractible in a first direction, a second actuator that is extendable and contractible in a second direction, a support that supports the driven body via the first actuator and the second actuator, a first connection mechanism unit that connects at least either between the first actuator and the driven body or between the first actuator and the support, and a second connection mechanism unit that connects at least either between the second actuator and the driven body or between the second actuator and the support. The first connection mechanism unit and the second connection mechanism unit have at least one degree of rotational freedom.

16 Claims, 21 Drawing Sheets

(51) Int. Cl.
  *G02B 27/64* (2006.01)
  *G03B 5/04* (2021.01)
(58) Field of Classification Search
  USPC .................................................. 348/208.11
  See application file for complete search history.

(56) References Cited

U.S. PATENT DOCUMENTS

| | | |
|---|---|---|
| 2007/0041721 A1 | 2/2007 | Ito |
| 2007/0109412 A1* | 5/2007 | Hara .................... H04N 5/2251 348/207.1 |
| 2007/0122132 A1* | 5/2007 | Misawa ............... G02B 27/646 396/55 |
| 2007/0279497 A1 | 12/2007 | Wada |
| 2008/0136949 A1* | 6/2008 | Huang ............... H04N 5/23287 348/294 |
| 2008/0273092 A1* | 11/2008 | Chiou ............... H04N 5/23248 348/208.11 |
| 2009/0147340 A1* | 6/2009 | Lipton .................... G03B 9/02 359/230 |
| 2009/0213236 A1* | 8/2009 | Chiou ............... H04N 5/23287 348/208.11 |

FOREIGN PATENT DOCUMENTS

| | | |
|---|---|---|
| JP | 2007-158587 A | 6/2007 |
| JP | 2007140169 A | 6/2007 |
| JP | 2007-192847 A | 8/2007 |

\* cited by examiner

FIG. 1
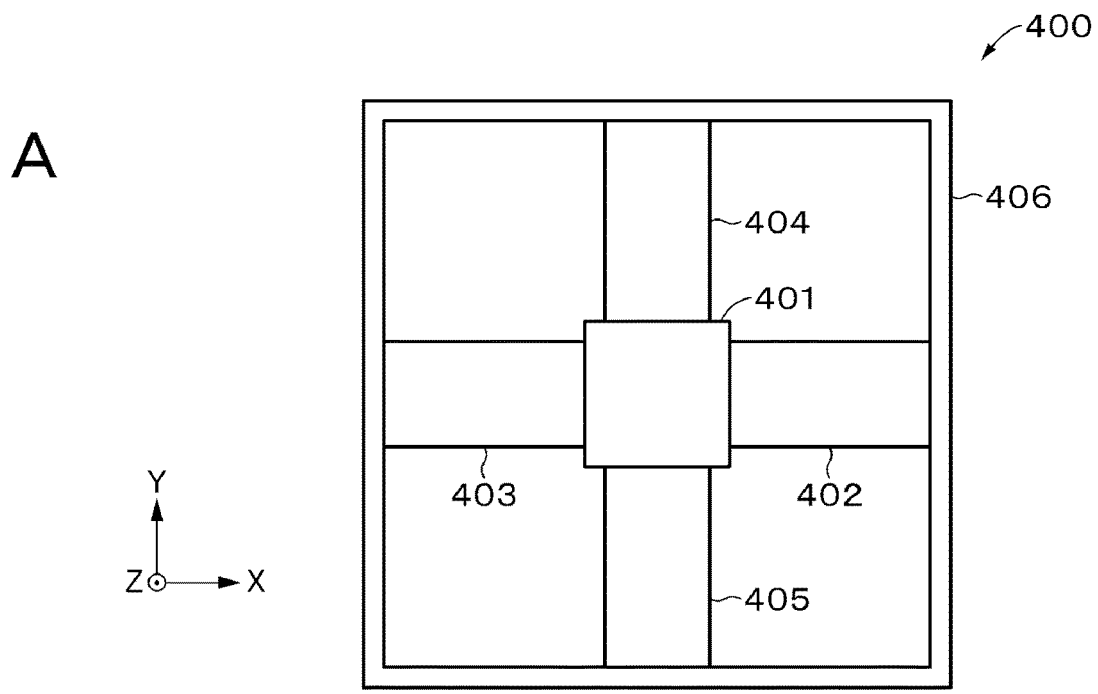
A
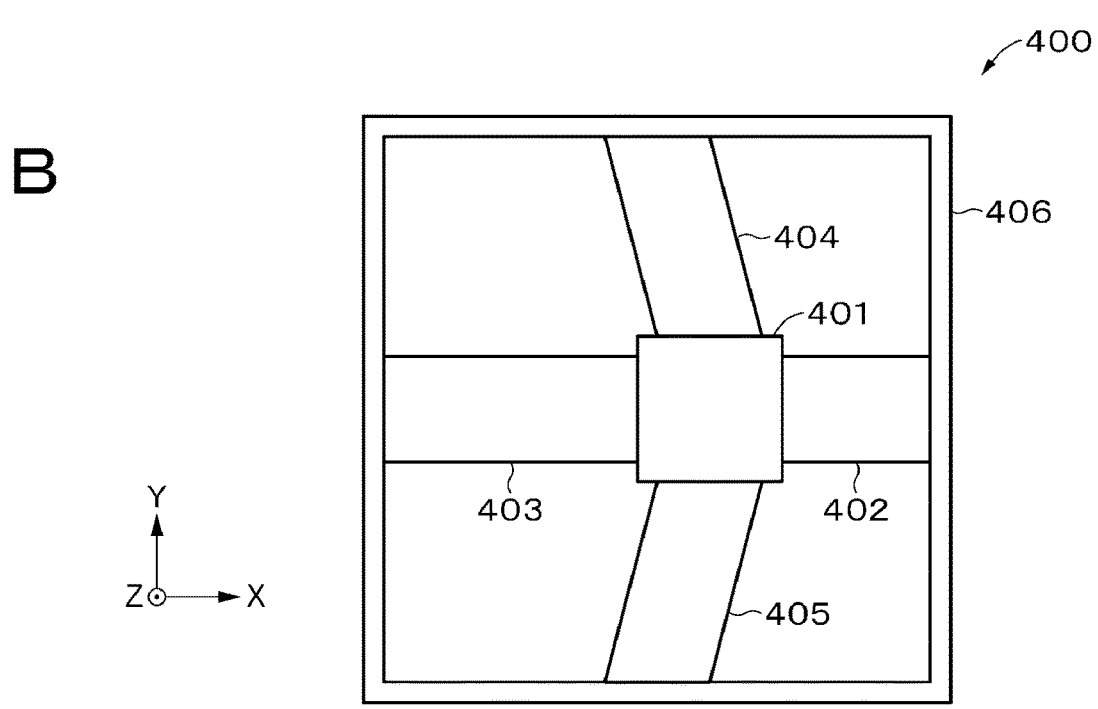
B

FIG. 2
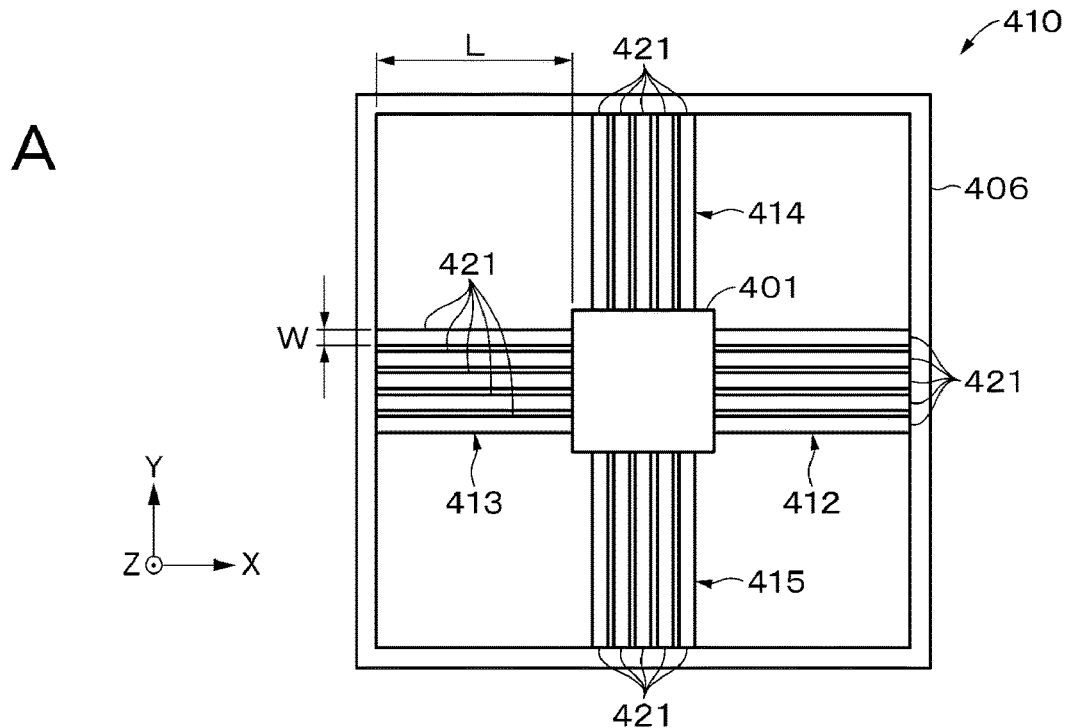
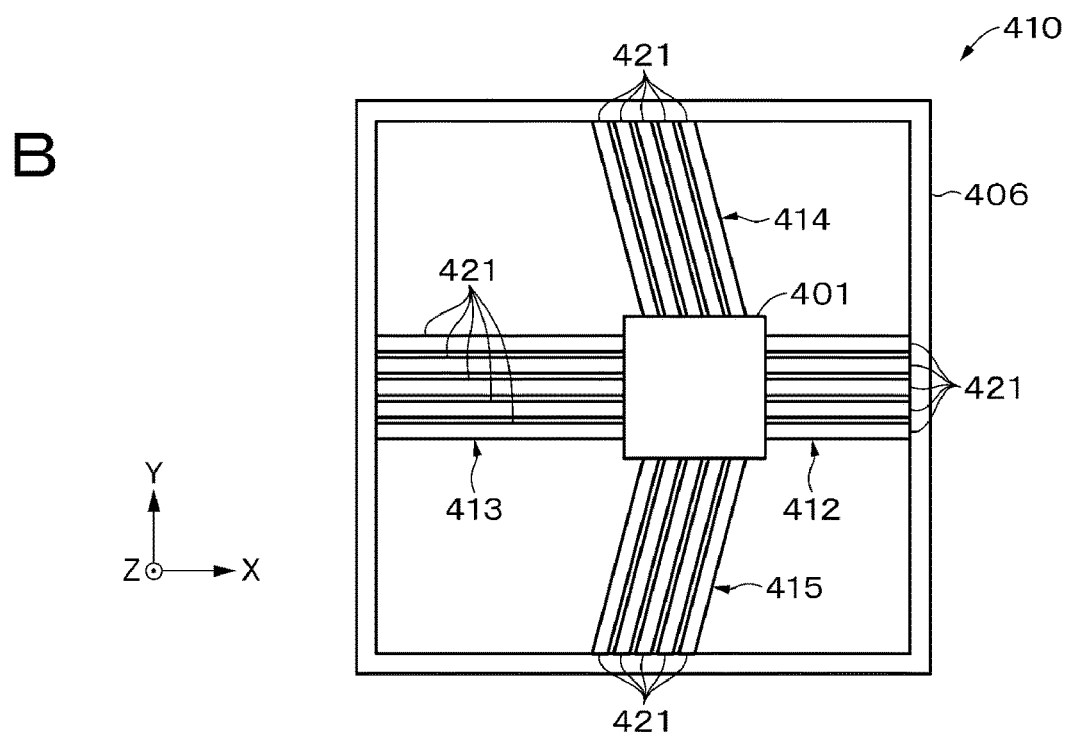

FIG. 3
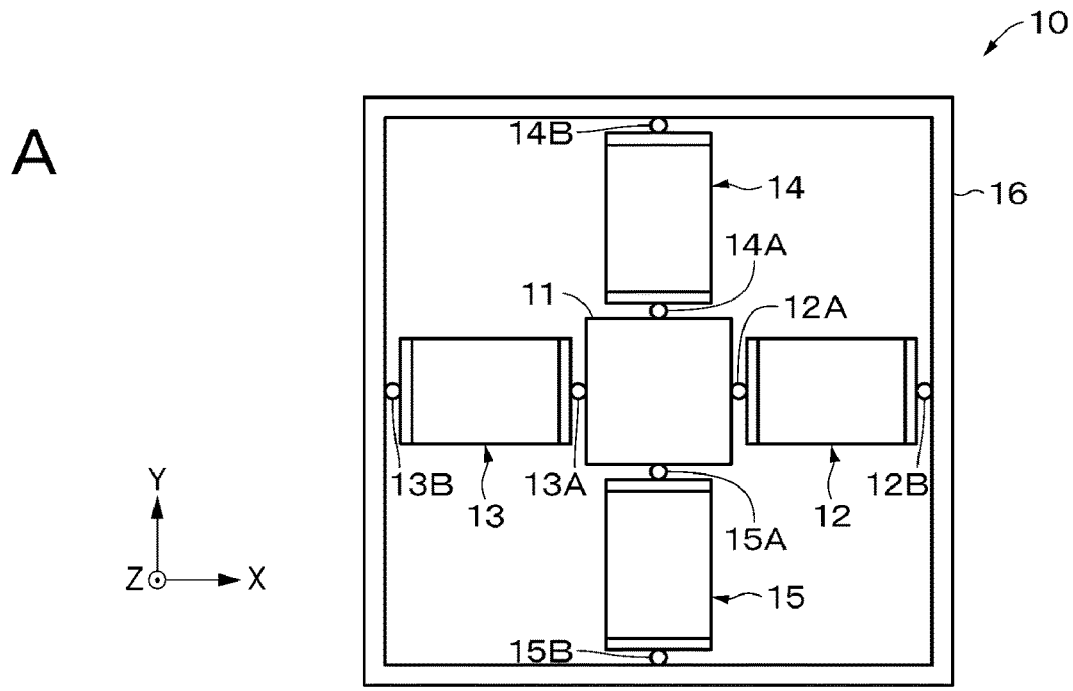
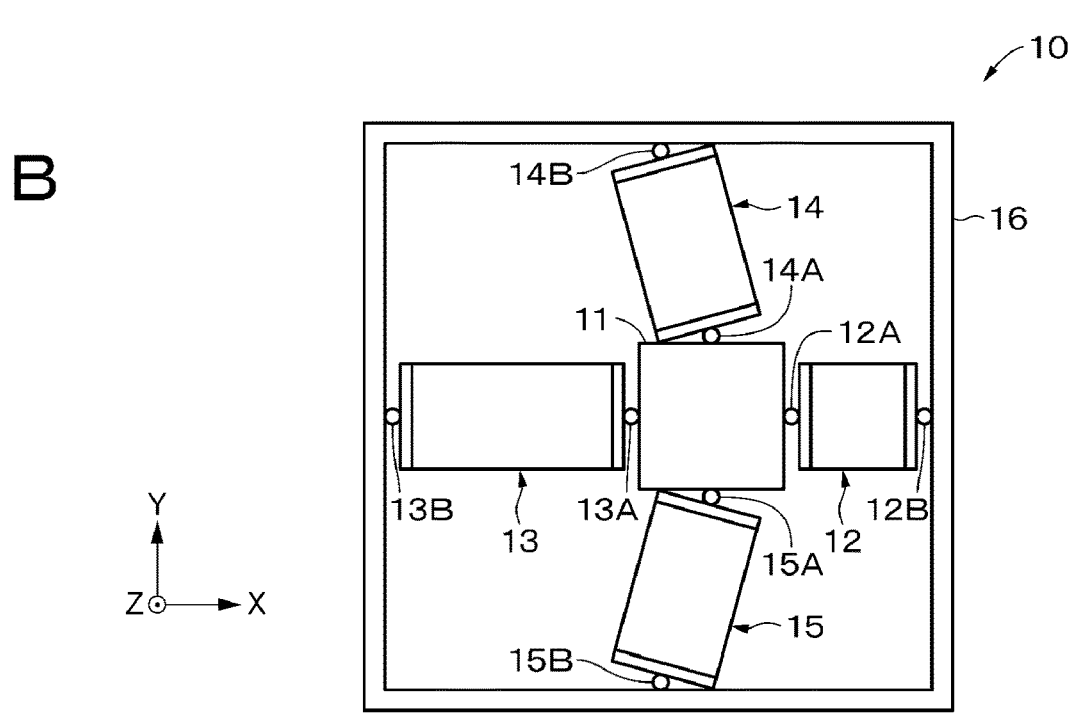

FIG. 5
A
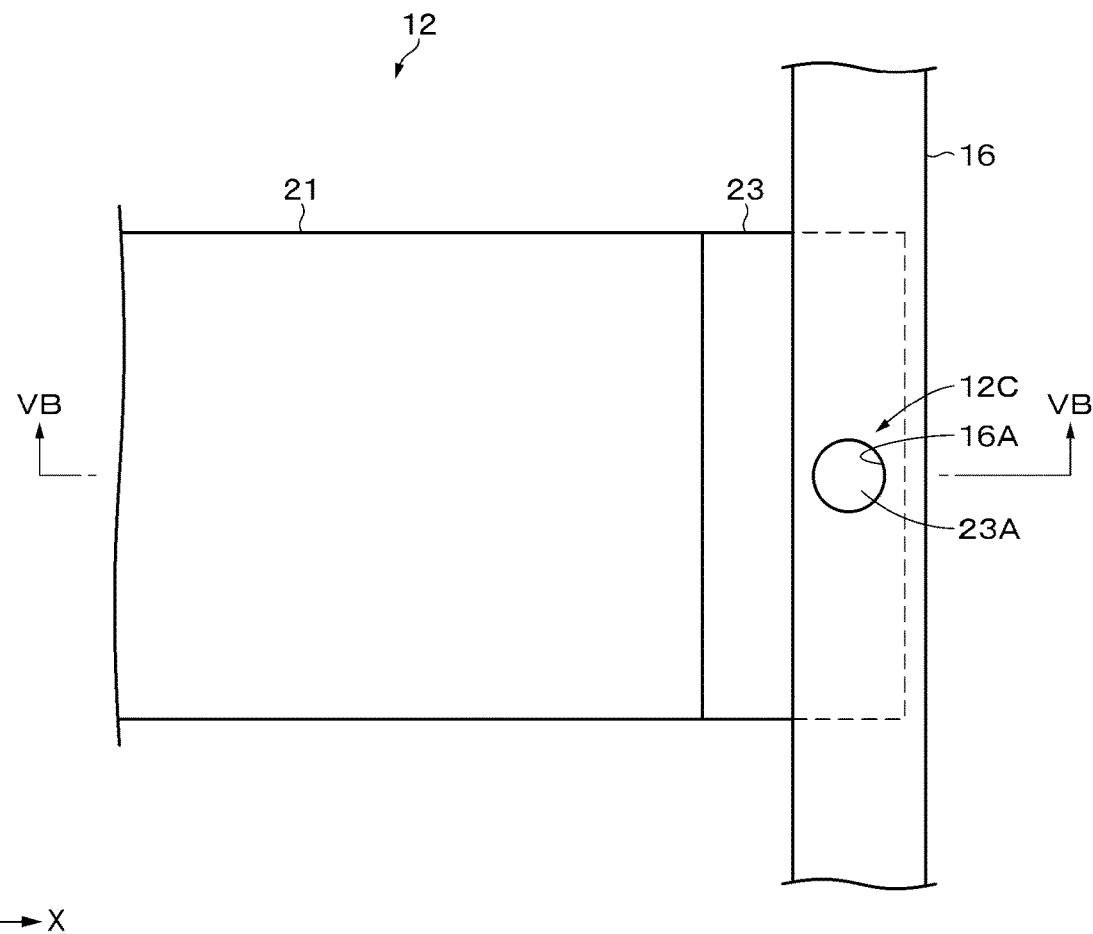
B
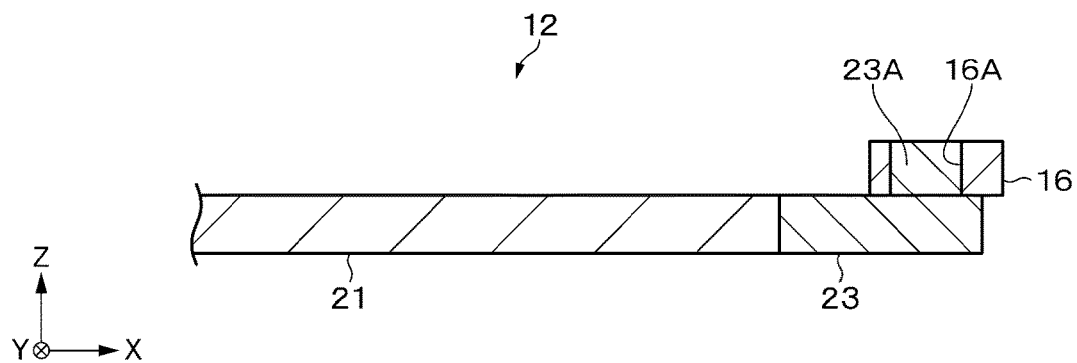

FIG. 10
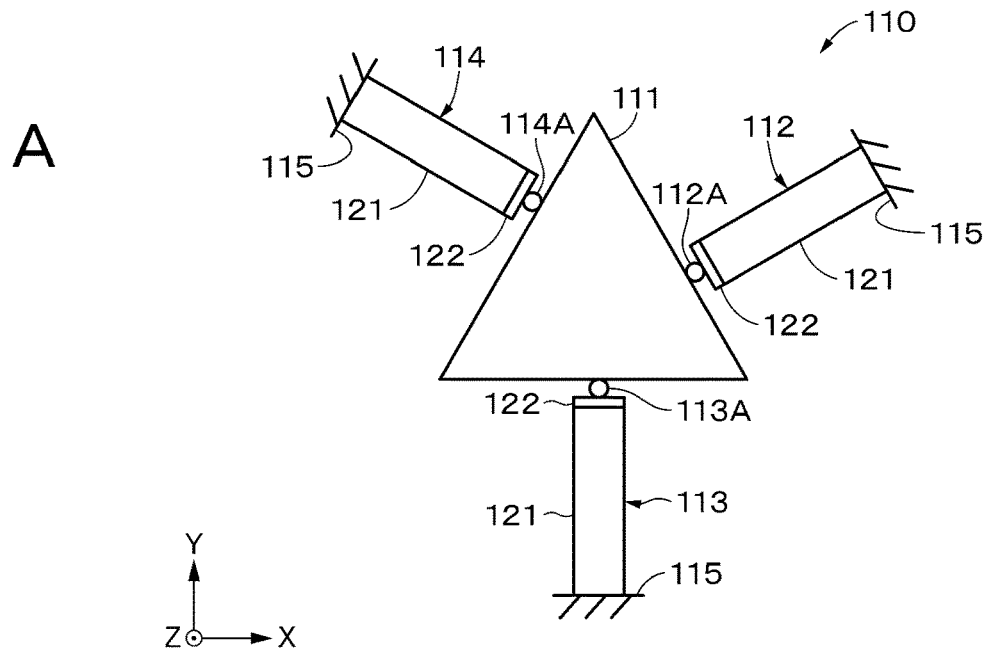
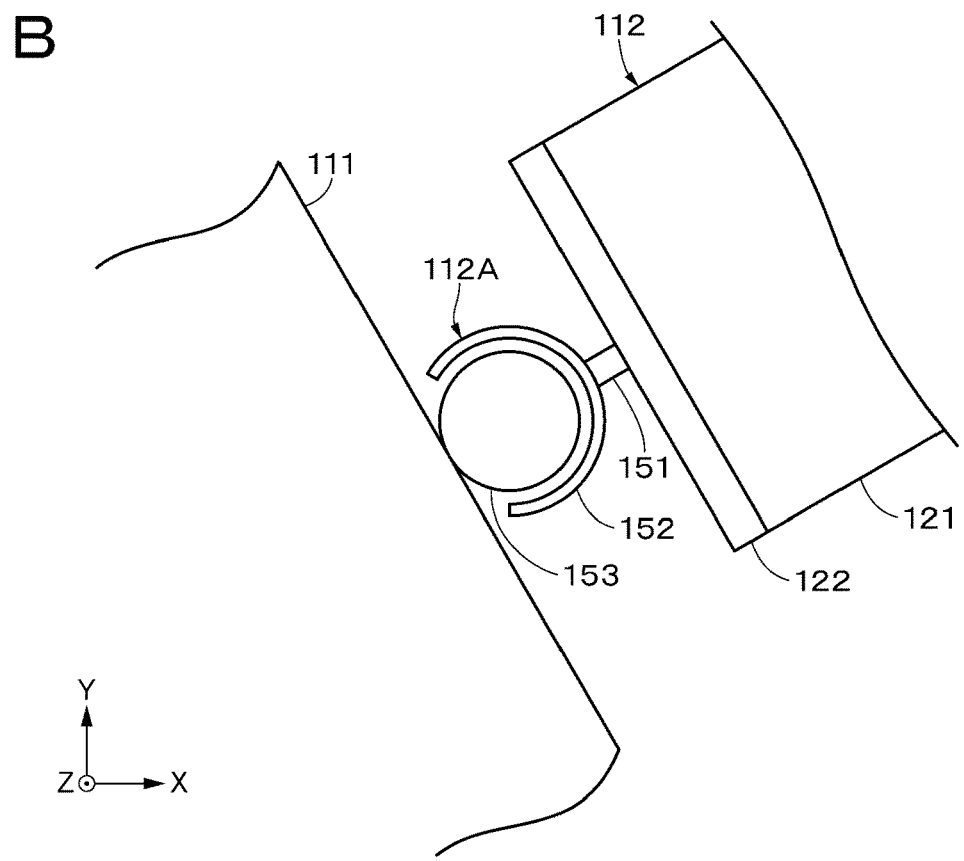

FIG. 11
A
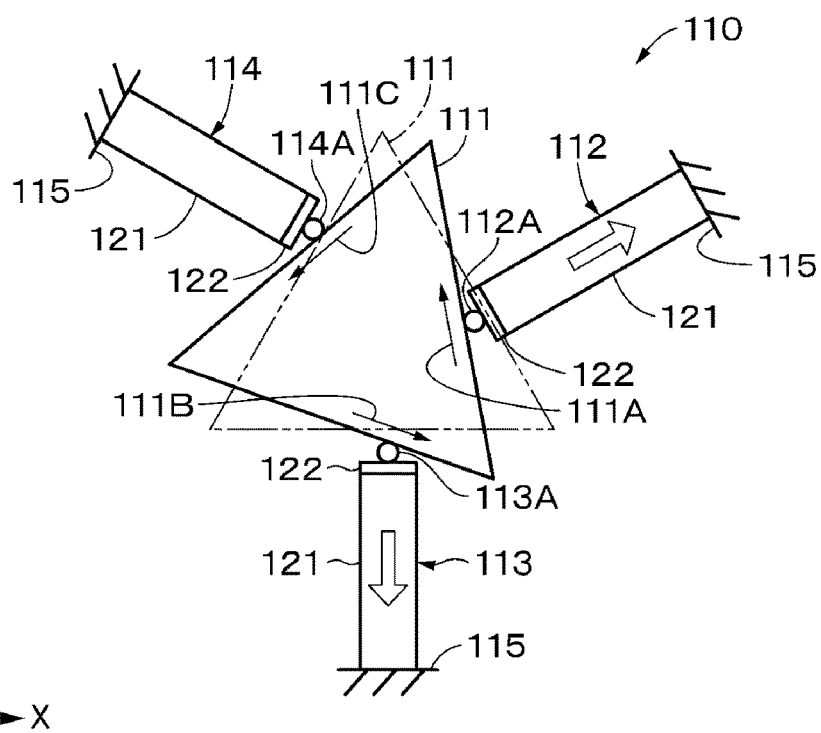
B
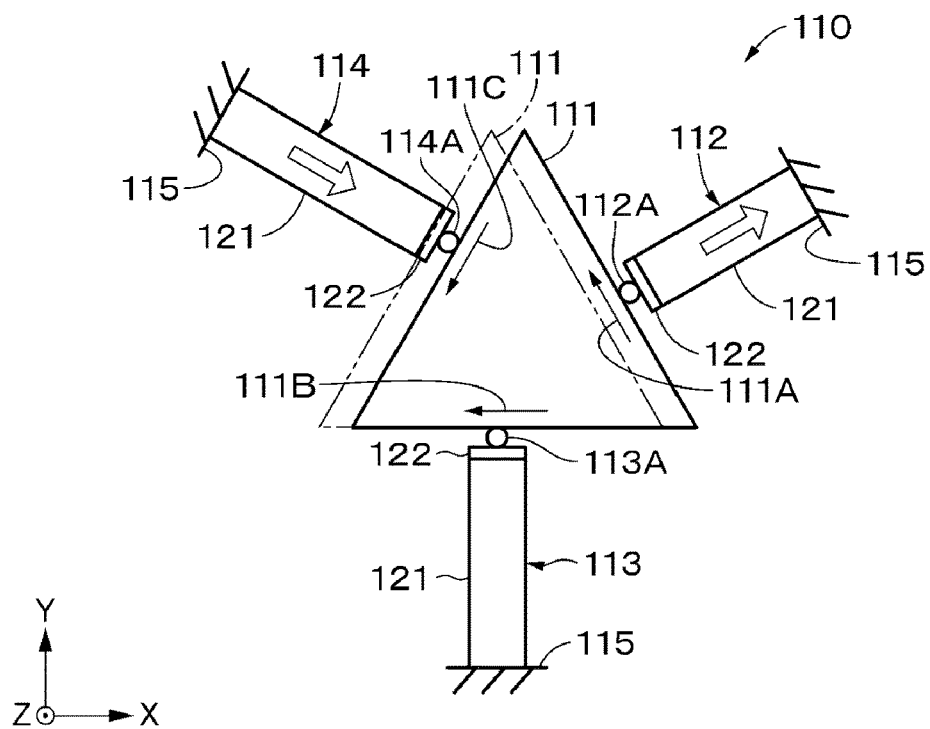

FIG. 12
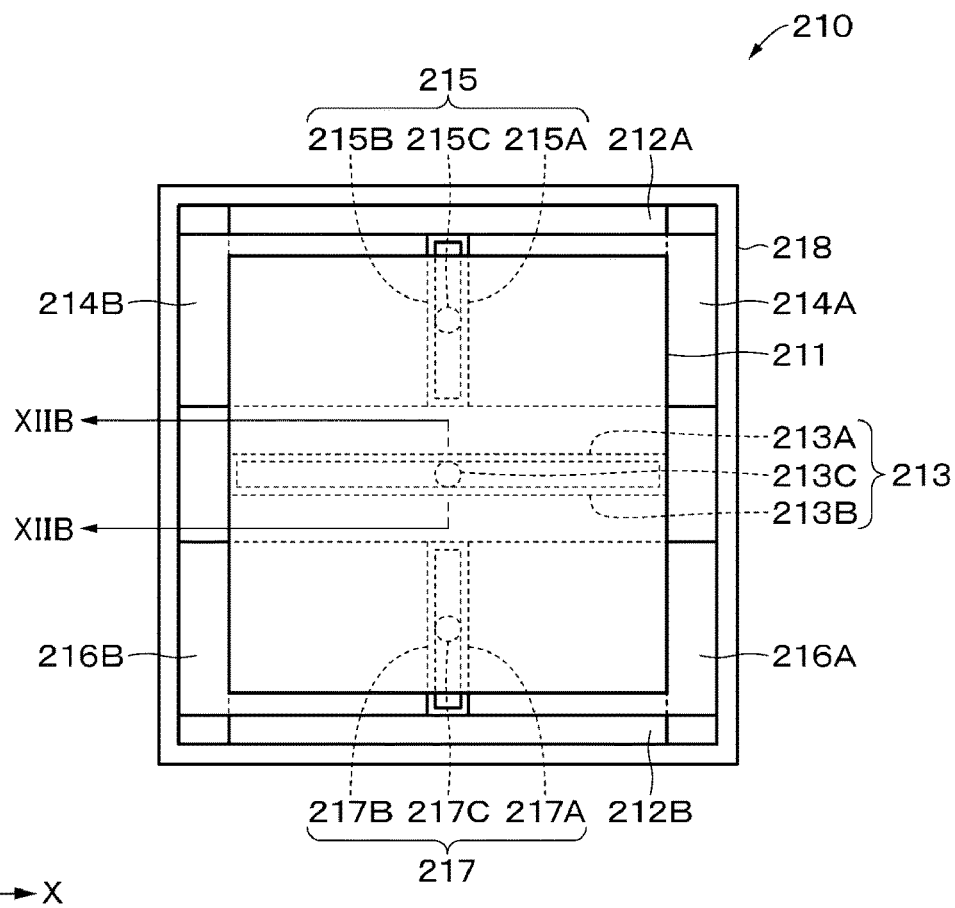
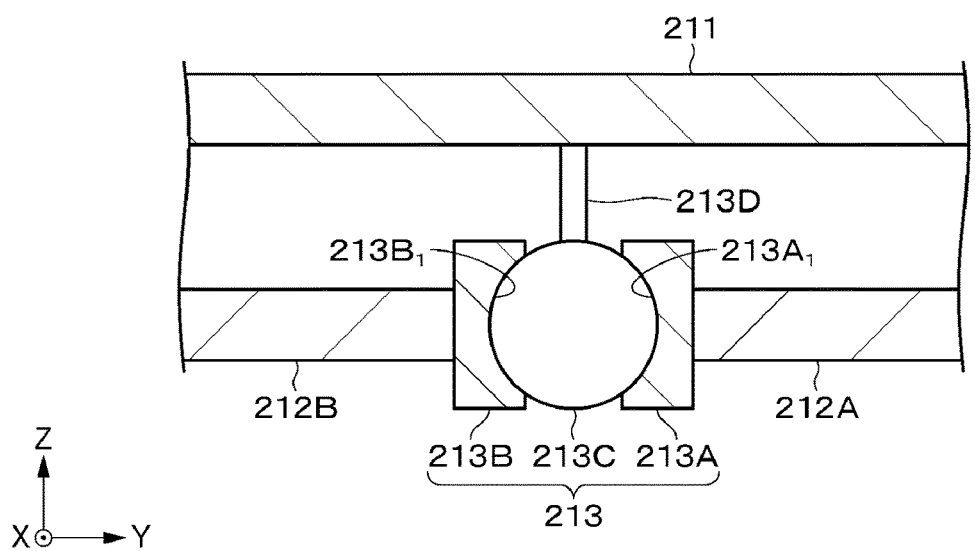

FIG. 13
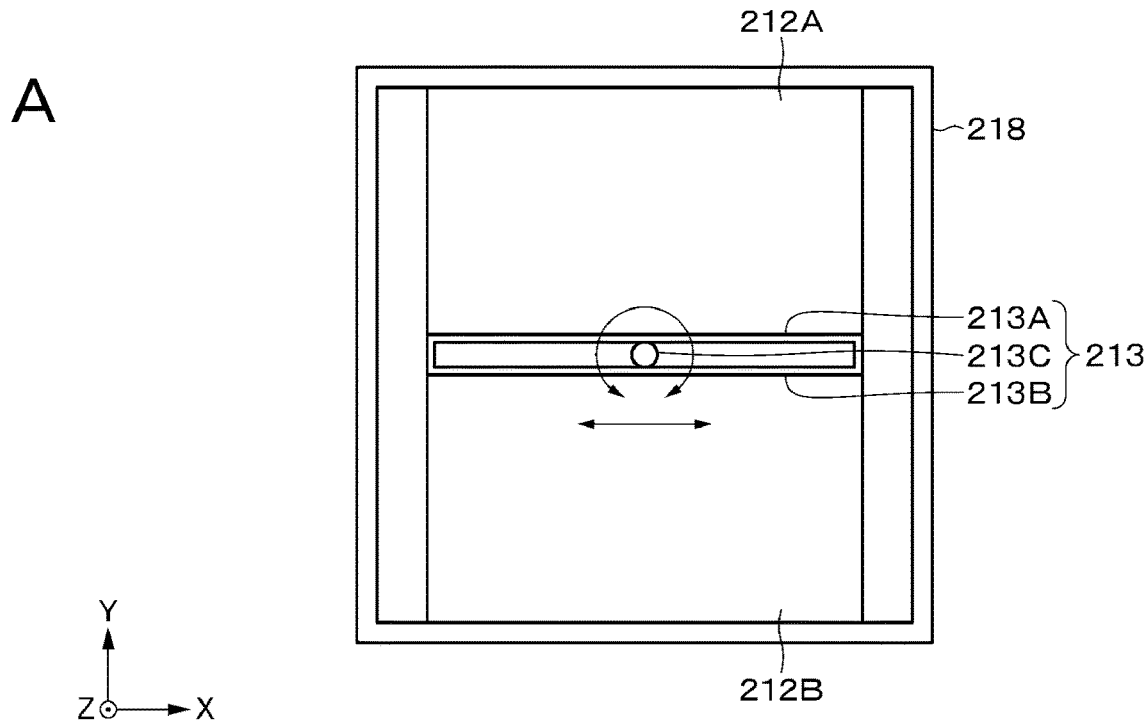
A
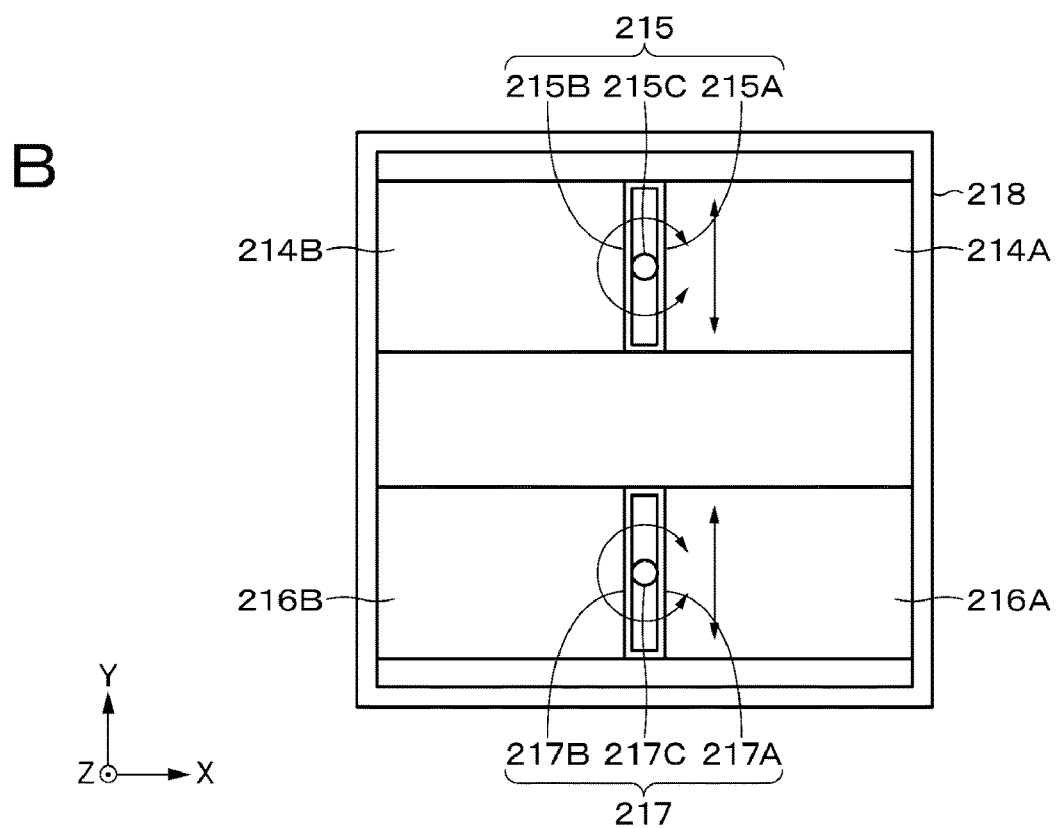
B

FIG. 15
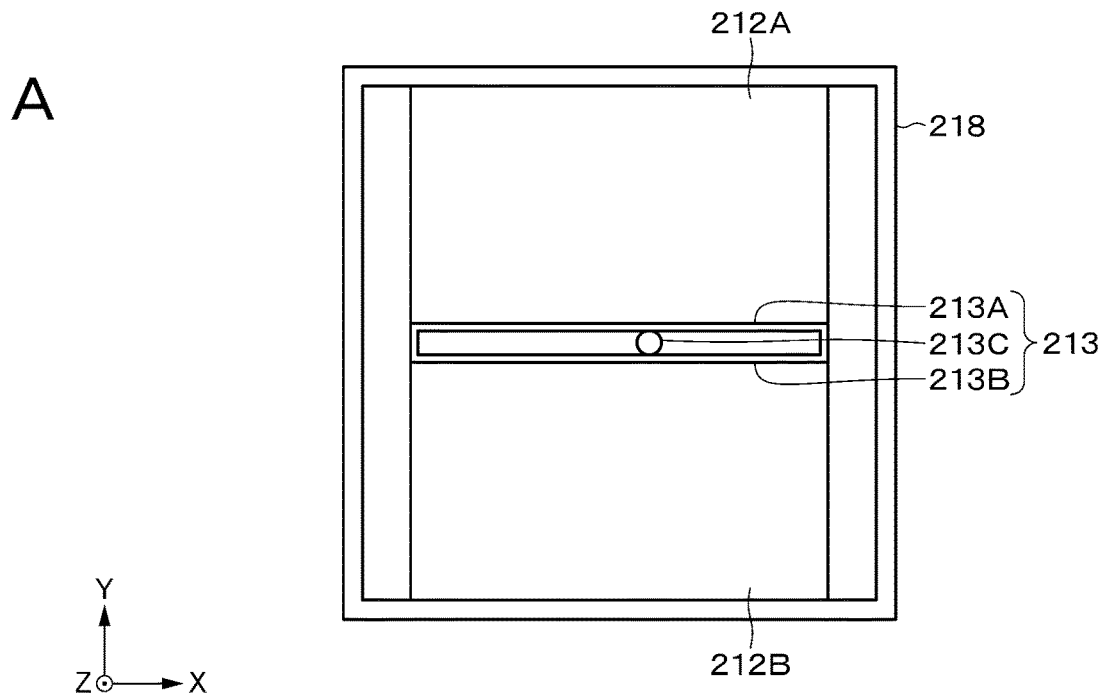
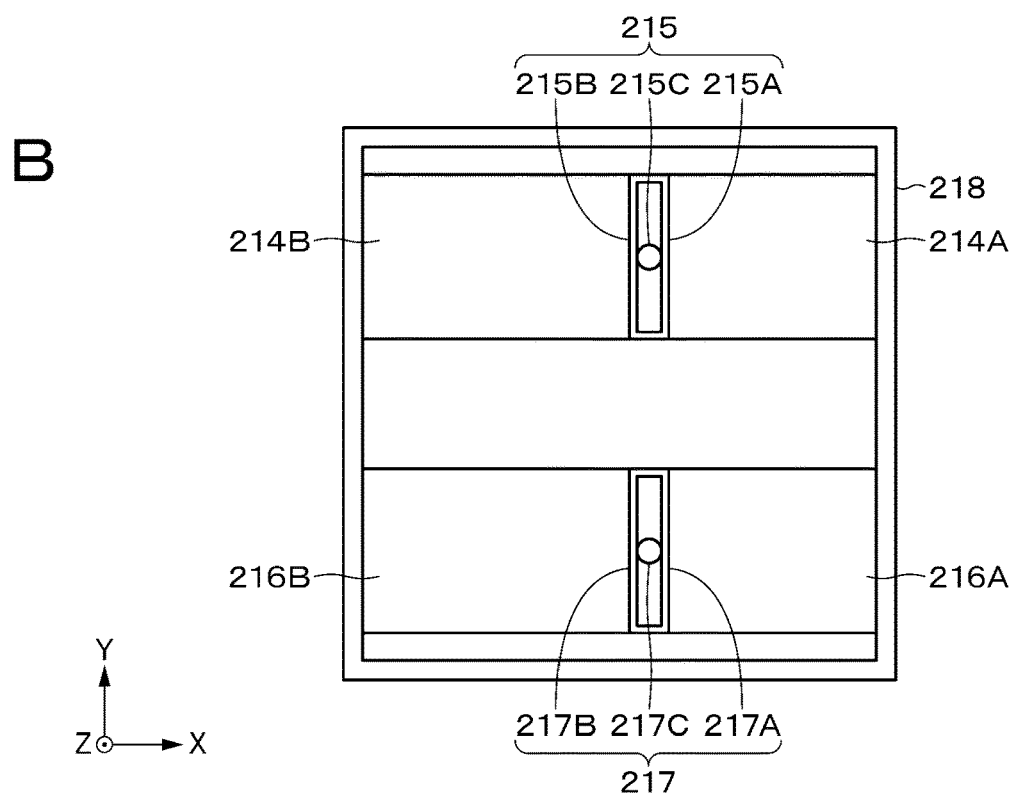

FIG. 17
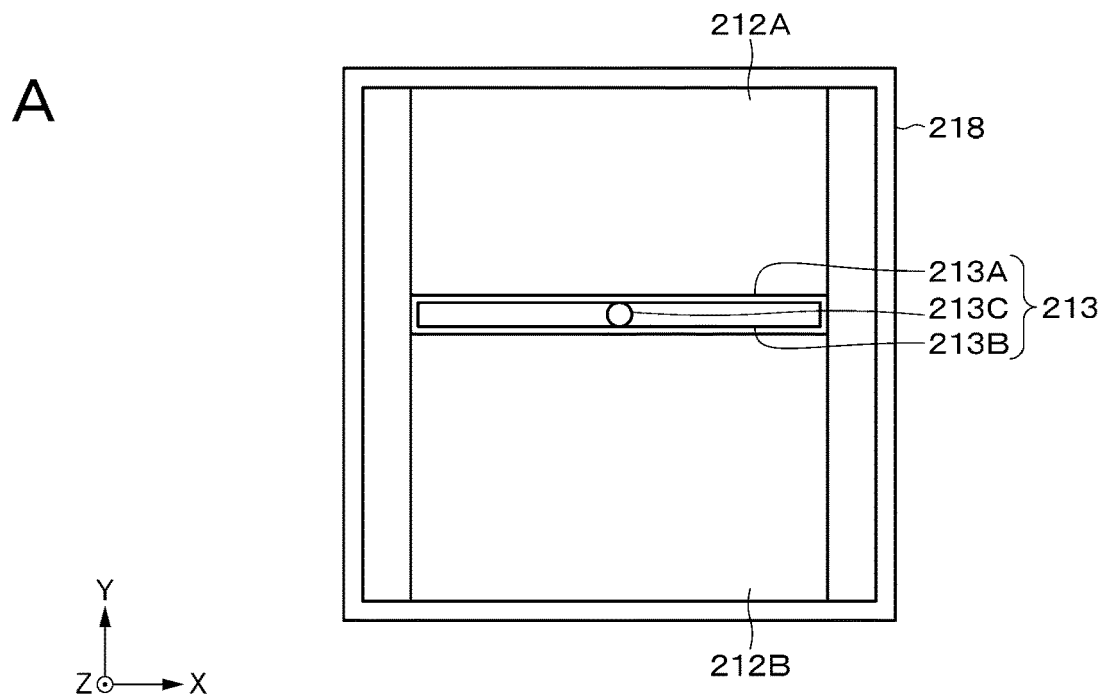
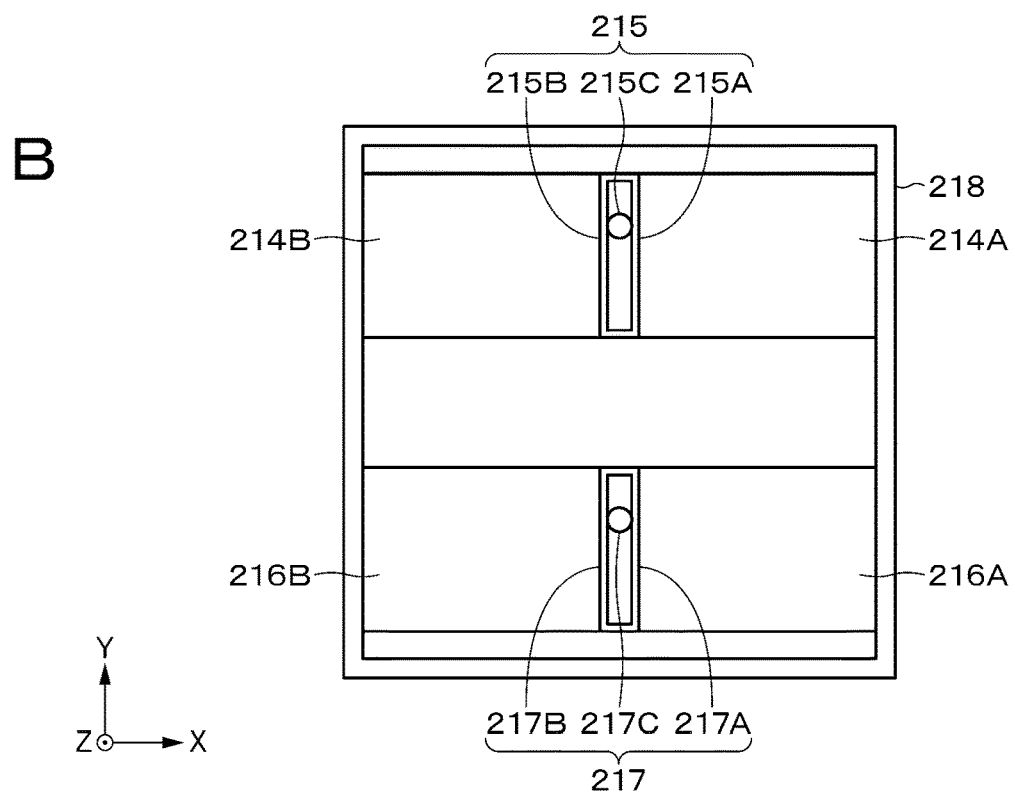

FIG. 19
A
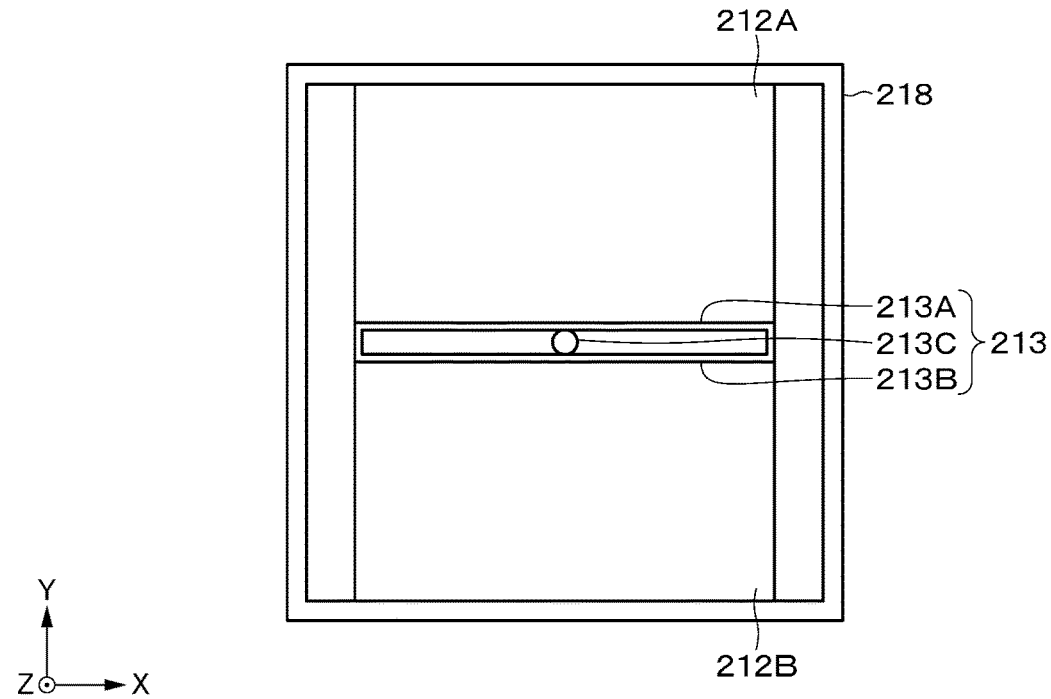
B
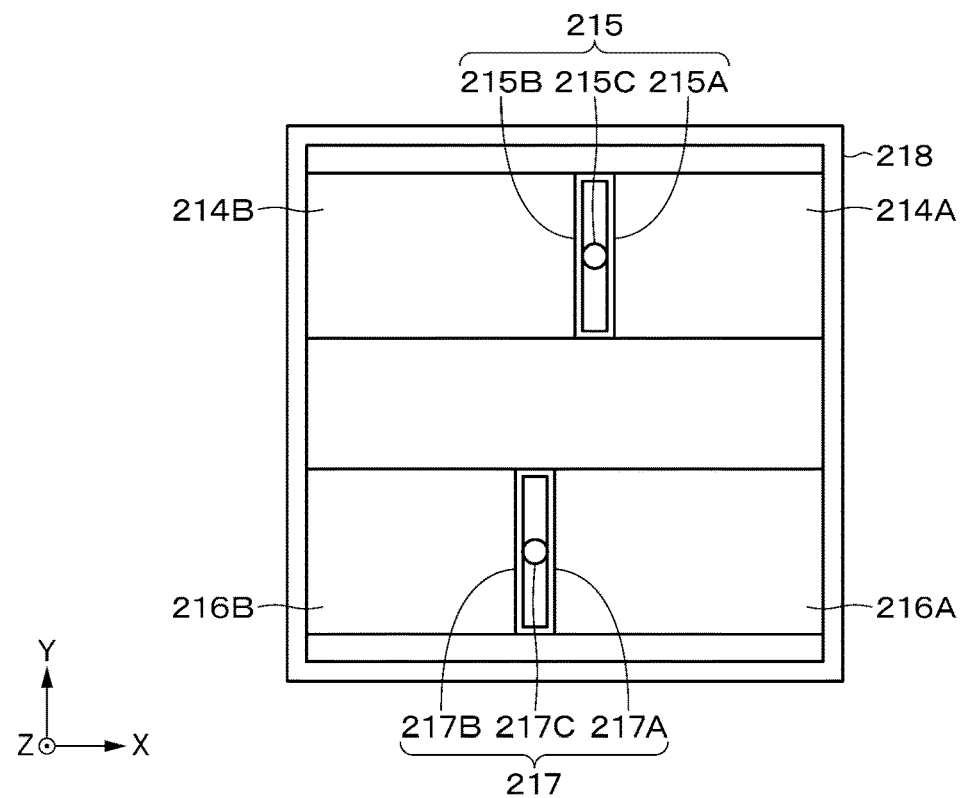

FIG. 21
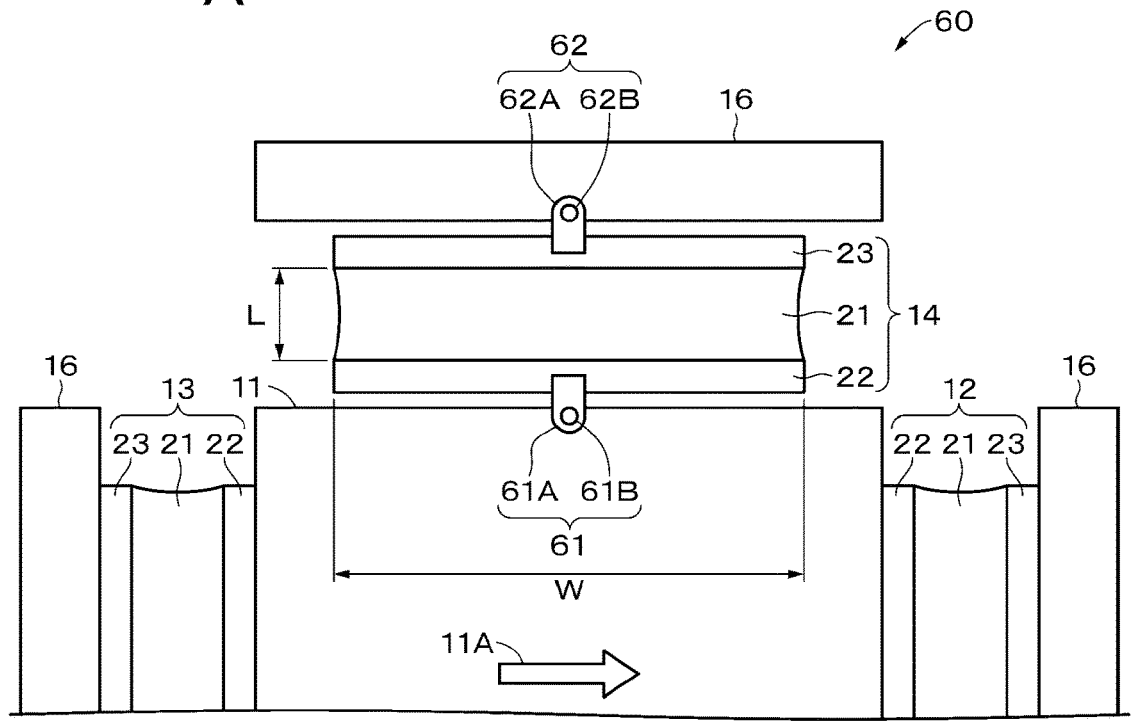
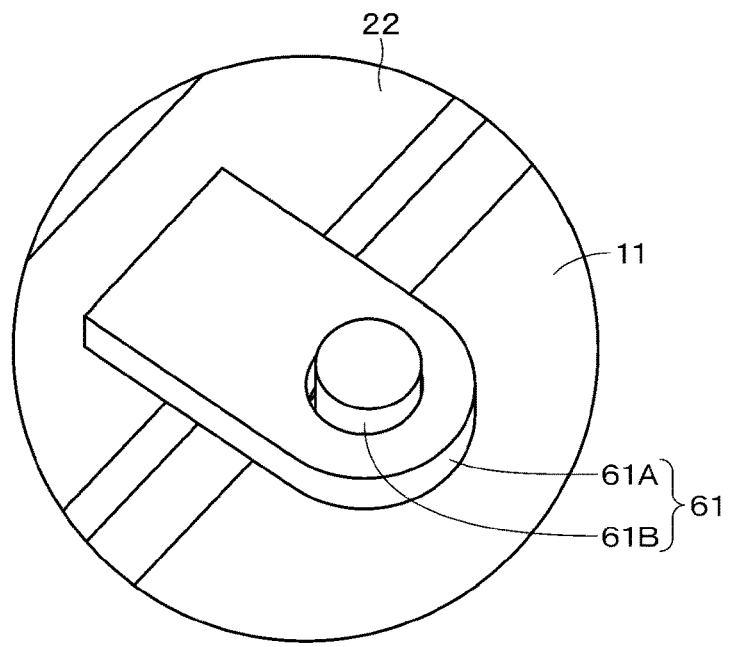

SHAKE CORRECTION DEVICE INCLUDING DIELECTRIC ELASTOMER ACTUATOR, DRIVING DEVICE, IMAGING DEVICE, AND ELECTRONIC DEVICE

CROSS-REFERENCE TO RELATED APPLICATIONS

The present application claims the benefit of International Application No. PCT/JP2019/026165, filed Jul. 1, 2019, which claims priority to Japanese Application No. 2018-127806, filed Jul. 4, 2018, the disclosures of which are incorporated herein by reference.

TECHNICAL FIELD

The present disclosure relates to a shake correction device, a driving device, an imaging device, and an electronic device.

BACKGROUND ART

In recent years, it has become common for digital cameras to be equipped with a shake correction device. For this reason, active research has been conducted on a driving device having two or more axes (multi-axis driving device) using an actuator.

For example, Patent Document 1 describes that a hand-shake correction device is formed by using a polymer actuator element in order to achieve compactness with a simple structure.

CITATION LIST

Patent Document

Patent Document 1: Japanese Patent Application Laid-Open No. 2009-92819

SUMMARY OF THE INVENTION

Problems to be Solved by the Invention

An object of the present disclosure is to provide a shake correction device, a driving device, an imaging device, and an electronic device capable of driving two or more axes.

Solutions to Problems

In order to solve the above-described problems, a first disclosure is a shake correction device including a driven body, a first actuator that is extendable and contractible in a first direction, a second actuator that is extendable and contractible in a second direction, a support that supports the driven body via the first actuator and the second actuator, a first connection mechanism unit that connects at least either between the first actuator and the driven body or between the first actuator and the support, and a second connection mechanism unit that connects at least either between the second actuator and the driven body or between the second actuator and the support, in which the first connection mechanism unit and the second connection mechanism unit have at least one degree of rotational freedom.

A second disclosure is a shake correction device including a first actuator that is extendable and contractible in a first direction, a second actuator and a third actuator that are provided on the first actuator and are extendable and contractible in a second direction, a driven body that is provided on the second actuator and the third actuator, a support that supports the first actuator, the second actuator, and the third actuator, a first connection mechanism unit that connects the first actuator and the driven body, a second connection mechanism unit that connects the second actuator and the driven body, and a third connection mechanism unit that connects the third actuator and the driven body, in which the first connection mechanism unit has a degree of translational freedom that allows the driven body to move in the second direction, and a degree of rotational freedom that allows the driven body to rotate around an axis orthogonal to the first direction and the second direction, the second connection mechanism unit and the third connection mechanism unit have a degree of translational freedom that allows the driven body to move in the first direction and a degree of rotational freedom that allows the driven body to rotate around the axis, and the first connection mechanism unit is provided between the second connection mechanism unit and the third connection mechanism unit.

A third disclosure is a driving device including a driven body, a first actuator that is extendable and contractible in a first direction, a second actuator that is extendable and contractible in a second direction, a support that supports the driven body via the first actuator and the second actuator, a first connection mechanism unit that connects at least either between the first actuator and the driven body or between the first actuator and the support, and a second connection mechanism unit that connects at least either between the second actuator and the driven body or between the second actuator and the support, in which the first connection mechanism unit and the second connection mechanism unit have at least one degree of rotational freedom.

A fourth disclosure is a driving device including a first actuator that is extendable and contractible in a first direction, a second actuator and a third actuator that are provided on the first actuator and are extendable and contractible in a second direction, a driven body provided on the second actuator and the third actuator, a support that supports the first actuator, the second actuator, and the third actuator, a first connection mechanism unit that connects the first actuator and the driven body, a second connection mechanism unit that connects the second actuator and the driven body, and a third connection mechanism unit that connects the third actuator and the driven body, in which the first connection mechanism unit has a degree of translational freedom that allows the driven body to move in the second direction, and a degree of rotational freedom that allows the driven body to rotate around an axis orthogonal to the first direction and the second direction, the second connection mechanism unit and the third connection mechanism unit have a degree of translational freedom that allows the driven body to move in the first direction and a degree of rotational freedom that allows the driven body to rotate around the axis, and the first connection mechanism unit is provided between the second connection mechanism unit and the third connection mechanism unit.

A fifth disclosure is an imaging device including the shake correction device of the first or second disclosure.

A sixth disclosure is an electronic device including the driving device of the third or fourth disclosure.

Effects of the Invention

According to the present disclosure, it is possible to achieve a shake correction device or a driving device capable of driving two or more axes. Note that the effect described here is not necessarily limited, and may be any one of effects described in the present disclosure or an effect different from these effects.

BRIEF DESCRIPTION OF DRAWINGS

FIG. 1A is a schematic view illustrating a configuration of a driving device. FIG. 1B is a schematic view for explaining operation of the driving device.

FIG. 2A is a schematic view illustrating a configuration of a driving device. FIG. 2B is a schematic view for explaining operation of the driving device.

FIG. 3A is a schematic view illustrating an example of a configuration of a driving device according to a first embodiment of the present disclosure. FIG. 3B is a schematic view for explaining an example of operation of the driving device according to the first embodiment of the present disclosure.

FIG. 5A is a plan view illustrating a modification example of a connection mechanism unit. FIG. 5B is a cross-sectional view taken along a line VB-VB in FIG. 5A.

FIG. 10A is a schematic view illustrating an example of a configuration of a driving device according to a second embodiment of the present disclosure. FIG. 10B is an enlarged view representing a connection mechanism unit illustrated in FIG. 10A.

FIG. 11A is a schematic view for explaining an example of rotational driving operation of the driving device according to the second embodiment of the present disclosure. FIG. 11B is a schematic view for explaining an example of translational driving operation of the driving device according to the second embodiment of the present disclosure.

FIG. 12A is a schematic view illustrating an example of a configuration of a driving device according to a third embodiment of the present disclosure. FIG. 12B is a cross-sectional view taken along a line XIIB-XIIB in FIG. 12A.

FIG. 13A is a schematic view illustrating an example of a configuration of a lower layer of the driving device according to the third embodiment of the present disclosure.

FIG. 13B is a schematic view illustrating an example of a configuration of a middle layer of the driving device according to the third embodiment of the present disclosure.

FIG. 15A is a schematic view illustrating an example of a state of the lower layer of the driving device during translational driving in the X axis direction. FIG. 15B is a schematic view illustrating an example of a state of the middle layer of the driving device during translational driving in the X axis direction.

FIG. 17A is a schematic view illustrating an example of a state of the lower layer of the driving device during translational driving in the Y axis direction. FIG. 17B is a schematic view illustrating an example of a state of the middle layer of the driving device during translational driving in the Y axis direction.

FIG. 19A is a schematic view illustrating an example of the lower layer of the driving device during the rotational driving. FIG. 19B is a schematic view illustrating an example of the middle layer of the driving device during the rotational driving.

FIG. 21A is a plan view illustrating a configuration of a finite element method model of Reference Example 1. FIG. 21B is an enlarged perspective view illustrating a connection mechanism unit illustrated in FIG. 21A.

MODE FOR CARRYING OUT THE INVENTION

Figure 4:
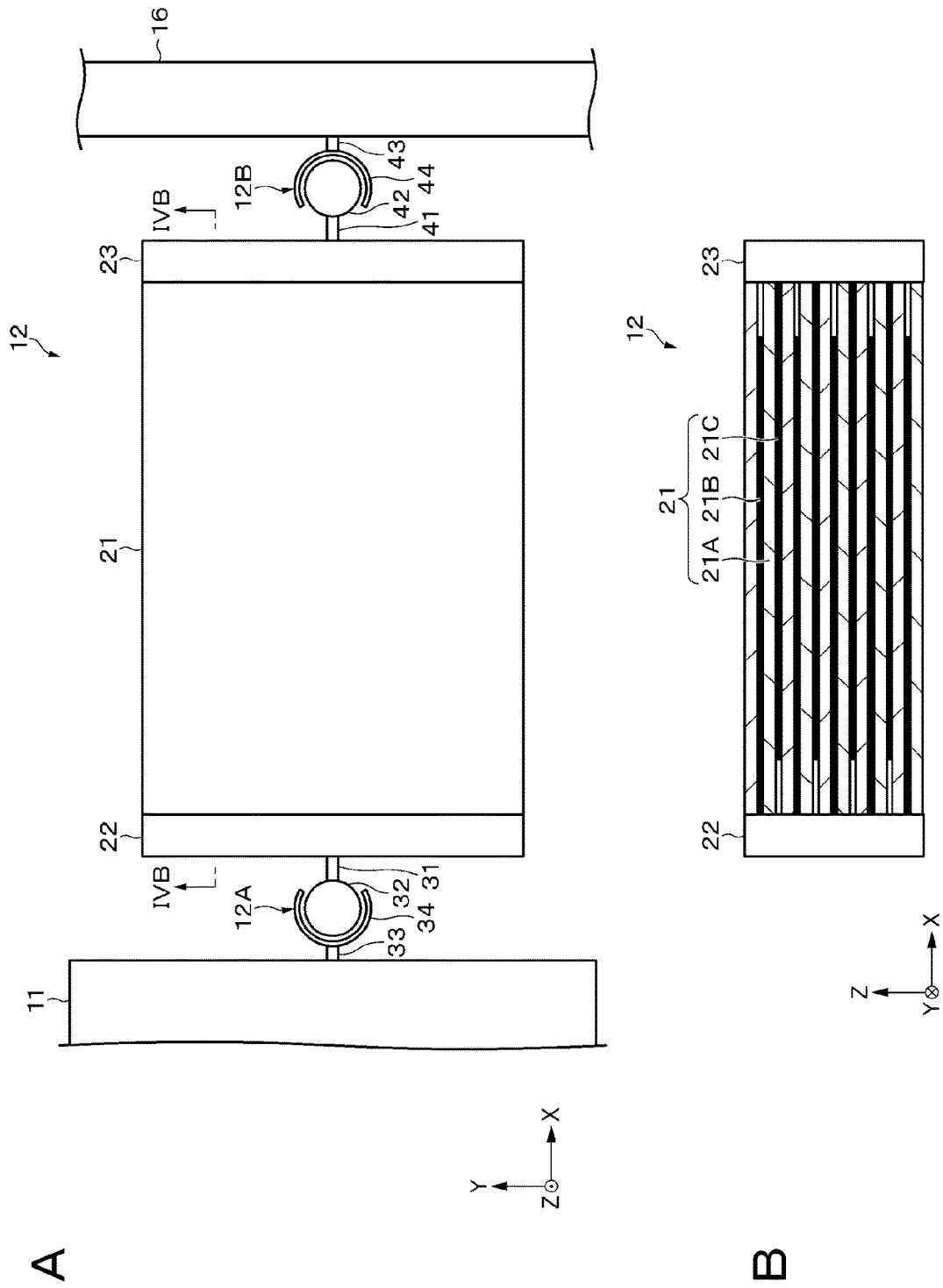
FIG. 4A is a plan view illustrating an example of a configuration of an actuator and a connection mechanism unit.
FIG. 4B is a cross-sectional view taken along a line IVB-IVB in FIG. 4A.

The embodiments of the present disclosure will be described in the following order.
1 First embodiment (example of driving device)
2 Second embodiment (example of driving device)
3 Third embodiment (example of driving device)
4 Fourth embodiment (example of imaging device)

1 First Embodiment

[Outline]

FIG. 1A illustrates an example of a configuration of a driving device 400. Note that in the following, an XYZ orthogonal coordinate system will be used for clarity of description. Further, in the following description, X, Y axis directions refer to in-plane directions of a main surface of a driven body 401 having a plate shape, and first and second directions orthogonal to each other. Further, a Z axis direction refers to a direction perpendicular to the main surface of the driven body 401, that is, a third direction perpendicular to both the first and second directions. Note that in a case where the driving device 400 is a shake correction device for an imaging device or the like, the X and Y axis directions are directions perpendicular to an optical axis direction of the imaging device or the like, and the Z axis direction is an optical axis direction of the imaging device or the like.

The driving device 400 is what is called a dual-axis driving device that is movable in the X axis direction and the Y axis direction, and includes a driven body 401, four actuators 402 to 405 that move the driven body 401 in the X and Y axis directions, and a support (frame) 406 that supports the driven body 401 via these actuators 402 to 405. The actuators 402 to 405 include dielectric elastomer actuators (hereinafter referred to as "DEA").

For example, when the actuator 403 is driven and the driven body 401 is moved in the X axis direction as illustrated in FIG. 1B in the driving device 400 having the above configuration, although force generated by the actuator 403 is large, shear rigidity of the actuators 404 and 405, which do not contribute to driving, becomes a load and hinders movement of the driven body 401.

FIG. 2A illustrates an example of a configuration of a driving device 410. The driving device 410 has a configuration similar to that of the driving device 400 except that actuator groups 412 to 415 including a plurality of actuators 421 having a high aspect ratio are included instead of the actuators 402 to 405. Here, the aspect ratio means the ratio L/W of a length L of the actuator 421 to a width W of the actuator 421.

For example, when the actuator group 413 is driven and the driven body 401 is moved in the X axis direction as illustrated in FIG. 2B in the driving device 410 having the above configuration, shear rigidity of the actuator groups 414 and 415 becomes small, but force generated by the actuator group 413 also becomes small.

Then, as a result of diligently studies conducted on a driving device capable of suppressing the shear rigidity while suppressing decrease in the generated force in view of the above-described problems of the two driving devices 400 and 410, the present inventors have found a driving device having a configuration as follows. That is, a driving device has been found that includes a connection mechanism unit that connects at least either between an actuator and a driven body or between the actuator and a support, in which the connection mechanism unit has at least one degree of rotational freedom (at least one degree of rotational freedom of one axis).

[Configuration of Driving Device]

FIG. 3A illustrates an example of a configuration of a driving device 10 according to a first embodiment of the present disclosure. The driving device 10 is a dual-axis driving device capable of translational driving in the X axis direction and the Y axis direction, and more specifically, a dual-axis driven shake correction device used in an imaging device or the like. The driving device 10 includes a driven body 11, a set of actuators (first actuators) 12 and 13, a set of actuators (second actuators) 14 and 15, a support 16, a connection mechanism unit (first connection mechanism unit) 12A, 12B, 13A, and 13B, and a connection mechanism unit (second connection mechanism unit) 14A, 14B, 15A, and 15B. Note that an actuator driving unit and an actuator control unit that are not illustrated are connected to the driving device 10.

(Driven Body)

The driven body 11 includes a driven object such as an imaging element or a lens. More specifically, the driven body 11 includes a driven object and a support member that supports the driven object. Note that the configuration of the driven body 11 is not limited to this, and may be a support member that supports a driven object. As the imaging element, for example, a charge coupled device (CCD) image sensor or a complementary metal oxide semiconductor (CMOS) image sensor is used. The driven body 11 has a rectangular plate shape having a set of first and second side portions opposing each other and a set of third and fourth side portions opposing each other. Here, the side portion means a portion including a side surface of the driven body 11 and peripheral edges of both main surfaces of the driven body 11.

(Support)

The support 16 supports the driven body 11 via the actuators 12 to 15. The support 16 is a frame-shaped body having first to fourth wall portions that oppose the first to fourth side portions, respectively, of the driven body 11. The first to fourth wall portions are provided at predetermined distances from the first to fourth side portions of the driven body 111, respectively. The support 16 may be a part of a housing of the imaging device in which the driving device 10 is provided.

(Actuators)

The set of actuators 12 and 13 is extendable and contractible in the ±X axis direction (first direction). The set of actuators 14 and 15 is extendable and contractible in the ±Y axis direction (second direction orthogonal to the first direction).

The actuators 12 to 15 have a rectangular film shape having first and second end portions opposing each other. Specifically, as illustrated in FIG. 4A, the actuators 12 to 15 include a rectangular film-shaped actuator body 21 having first and second end portions opposing each other in the first direction (extension and contraction direction), a first end member 22 provided at the first end portion, and a second end member 23 provided at the second end portion. Note that the actuators 12 to 15 may employ a configuration in which the first end member 22 and the second end member 23 are not provided, but from the viewpoint of improving the generated force, it is preferable to include the first end member 22 and the second end member 23.

A space is provided between the driven body 11 and the support 16, and the actuators 12 to 15 are arranged in this space. More specifically, the actuator 12 is arranged in a space between the first side portion of the driven body 11 and the first wall portion of the support 16, and the actuator 13 is arranged in a space between the second side portion of the driven body 11 and the second wall portion of the support 16. Further, the actuator 14 is arranged in a space between the third side portion of the driven body 11 and the third wall portion of the support 16, and the actuator 15 is arranged in a space between the fourth side portion of the driven body 11 and the fourth wall portion of the support 16.

The first end members 22 of the actuators 12 to 15 are connected to the first to fourth side portions of the driven body 11 via connection mechanism units 12A to 15A, respectively. The second end members 23 of the actuators 12 to 15 are connected to the first to fourth wall portions of the support 16 via connection mechanism units 12B to 15B, respectively.

The actuator body 21 is what is called a DEA and has a rectangular film shape. As illustrated in FIG. 4B, the actuator body 21 is a stacked body including a plurality of dielectric elastomer layers 21A having elasticity, and a plurality of electrodes (first electrodes) 21B and a plurality of electrodes (second electrodes) 21C which are extendable and contractible according to extension and contraction of the dielectric elastomer layers 21A. The electrodes 21B and the electrodes 21C are alternately arranged between the stacked dielectric elastomer layers 21A. From the viewpoint of insulation, it is preferable that both main surfaces of the actuator body 21 are covered with the dielectric elastomer layers 21A.

The dielectric elastomer layers 21A contain, for example, an insulating elastomer as an insulating elastic material. The dielectric elastomer layers 21A may contain an additive, if necessary. The additive is, for example, at least one of a cross-linking agent, a plasticizer, an anti-aging agent, a surfactant, a viscosity modifier, a reinforcing agent, a coloring agent, or the like. The insulating elastomer includes, for example, at least one of acrylic rubber, silicone rubber, ethylene-propylene-diene ternary copolymer (EPDM), natural rubber (NR), butyl rubber (IIR), isoprene rubber (IR), acrylonitrile-butadiene copolymer rubber (NBR), hydrogenated acrylonitrile-butadiene copolymer rubber (H-NBR), hydrin-based rubber, chloroprene rubber (CR), fluororubber, urethane rubber, or the like.

The electrodes 21B and 21C include a conductive material. The electrodes 21B and 21C may further include at least one of an elastic binder, gel, suspension, or oil, if necessary. Further, the electrodes 21B and 21C may further contain an additive if necessary.

The conductive material is, for example, at least one of a conductive filler or a conductive polymer. Examples of the shape of the conductive filler include a spherical shape, an ellipsoidal shape, a needle shape, a plate shape, a scale shape, a tube shape, a wire shape, a stick shape (rod shape), a fibrous shape, an indefinite shape, and the like but is not limited thereto. Note that only one type of conductive filler may be used, or two or more types of conductive fillers may be used in combination.

The conductive filler includes, for example, at least one of a carbon-based filler, a metal-based filler, a metal oxide-based filler, or a metal coating-based filler. Here, the metal is defined as including a semimetal.

The carbon-based filler includes, for example, at least one of carbon black (for example, Ketjen black, acetylene black, and the like), porous carbon, carbon fiber (for example, PAN-based, pitch-based, and the like), carbon nanofibers, fullerene, graphene, vapor-grown carbon fibers (VGCF), carbon nanotubes (for example, SWCNT, MWCNT, and the like), carbon microcoils, or carbon nanohorns.

The metal-based filler includes, for example, at least one of copper, silver, gold, platinum, palladium, nickel, tin, cobalt, rhodium, iridium, iron, ruthenium, osmium, manganese, molybdenum, tungsten, niobium, tantalum, titanium, bismuth, antimony, or lead.

The metal oxide-based fillers include, for example, indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide, indium oxide-tin oxide, or zinc oxide-indium oxide-magnesium oxide.

The metal coating-based filler is a base filler coated with a metal. The base filler is, for example, mica, glass beads, glass fiber, carbon fiber, calcium carbonate, zinc oxide, or titanium oxide. The metal coating the base filler contains, for example, at least one of Ni or Al.

The conductive polymer includes, for example, at least one of polyethylene dioxythiophene/polystyrene sulfonic acid (PEDOT/PSS), polyaniline, polyacetylene, or polypyrrole.

The binder is preferably an elastomer. As the elastomer, those similar to the dielectric elastomer layers 21A can be exemplified. As the additive, those similar to the dielectric elastomer layers 21A can be exemplified.

The electrodes 21B and 21C may include a composite material (composite material). The composite material includes, for example, at least one of a composite material of an elastomer and at least one of a conductive polymer or a conductive filler, a composite material containing an elastic ion conductive material and electric field quality, a composite material of a polymer suspension (such as an acrylic emulsion) and at least one of a conductive polymer or a conductive filler, a composite material of a block copolymer and at least one of a conductive polymer or a conductive filler, or a composite material of polymer gel and ionic conductor.

The first and second end members 22 and 23 have conductivity. The first end member 22 is electrically connected to the plurality of electrodes 21B and has a function as an extraction electrode of the plurality of electrodes 21B. On the other hand, the second end member 23 is electrically connected to the plurality of electrodes 21C and has a function as an extraction electrode of the plurality of electrodes 21C. The first and second end members 22 and 23 are connected to the actuator driving unit.

The first and second end members 22 and 23 preferably have higher elastic moduli than the actuator body 21. Thus, when the driving device 10 is driven, deformation of the first and second end portions of the actuator body 21 can be suppressed. Therefore, the generated force can be improved. The elastic moduli (Young's moduli) of the first and second end members 22 and 23 are preferably 10 MPa or more from the viewpoint of improving the generated force. Upper limit values of the elastic moduli of the first and second end members 22 and 23 are not particularly limited, but are, for example, 1000 GPa or less. The first and second end members 22 and 23 include, for example, metal. The elastic moduli mentioned above are values measured in accordance with JIS K 6251: 2010.

(Connection Mechanism Unit)

The connection mechanism units 12A and 12B connect the first end portion of the actuator 12 and the first side portion of the driven body 11 and the second end portion of the actuator 12 and the first wall portion of the support 16, respectively. The connection mechanism units 13A and 13B connect the first end portion of the actuator 13 and the second side portion of the driven body 11 and the second end portion of the actuator 13 and the second wall portion of the support 16, respectively. The connection mechanism units 14A and 14B connect the first end portion of the actuator 14 and the third side portion of the driven body 11 and the second end portion of the actuator 14 and the third wall portion of the support 16, respectively. The connection mechanism units 15A and 15B connect the first end portion of the actuator 15 and the fourth side portion of the driven body 11 and the second end portion of the actuator 15 and the fourth wall portion of the support 16, respectively.

The connection mechanism units 12A and 12B have one degree of rotational freedom that allows rotation around a Z axis. Specifically, as illustrated in FIG. 4A, the connection mechanism unit 12A includes a shaft portion 31 provided at the first end portion of the actuator 12, a columnar body 32 supported by the shaft portion 31, a shaft portion 33 provided on the first side portion of the driven body 11, and a housing 34 supported by the shaft portion 33. Further, as illustrated in FIG. 4A, the connection mechanism unit 12B includes a shaft portion 41 provided at the second end portion of the actuator 12, a columnar body 42 supported by the shaft portion 41, a shaft portion 43 provided on the first wall portion of the second support 16, and a housing 44 supported by the shaft portion 43. The housings 34 and 44 rotatably house the columnar bodies 32 and 42 around Z axes, respectively.

The connection mechanism units 13A, 14A, and 15A each have a configuration similar to that of the connection mechanism unit 12A. Further, the connection mechanism units 13B, 14B, and 15B each have a configuration similar to that of the connection mechanism unit 12B.

(Actuator Control Unit)

The actuator control unit generates a control signal that controls driving of movement of the driven body 11, and supplies the generated control signal to the actuator driving unit.

(Actuator Driving Unit)

The actuator driving unit applies a voltage to the actuators 12 to 15 on the basis of the control signal from the actuator control unit to drive the actuators 12 to 15.

[Operation of Driving Device]

An example of operation of the driving device 10 having the above configuration will be described below.

By applying a voltage to the actuator 12 and extending the actuator 12, the driven body 11 can be moved in the −X axis direction. On the other hand, by applying a voltage to the actuator 13 and extending the actuator 13, the driven body 11 can be moved in the +X axis direction.

By applying a voltage to the actuator 14 and extending the actuator 14, the driven body 11 can be moved in the −Y axis direction. On the other hand, by applying a voltage to the actuator 15 and extending the actuator 15, the driven body 11 can be moved in the +Y axis direction.

For example, as illustrated in FIG. 3B, when the driven body 11 is moved in the X axis direction, the actuator 14 can change the direction by rotation of the connection mechanism units 14A and 14B, and the actuator 15 can change the direction by rotation of the connection mechanism units 15A and 15B. Therefore, it is possible to suppress shear rigidity while suppressing decrease in the generated force.

[Effects]

The driving device 10 according to the first embodiment includes a set of actuators 12 and 13 capable of moving the driven body 11 in the first direction (±X axis direction), and a set of actuators 14 and 15 capable of moving the driven body 11 in the second direction (±Y axis direction). Thus, the driven body 11 can be driven to translate in the X axis direction and the Y axis direction. Therefore, it is possible to provide a dual-axis driving device 10.

Further, the driving device 10 according to the first embodiment includes the connection mechanism units 12A and 12B that connect the actuator 12 and the driven body 11 and the actuator 12 and the support 16, respectively, the connection mechanism units 13A and 13B that connect the actuator 13 and the driven body 11 and the actuator 13 and the support 16, respectively, the connection mechanism units 14A and 14B that connect the actuator 14 and the driven body 11 and the actuator 14 and the support 16, respectively, and the connection mechanism units 15A and 15B that connect the actuator 15 and the driven body 11 and the actuator 15 and the support 16, respectively. Thus, when the driven body 11 is moved in the ±X axis direction, the actuators 14 and the actuator 15 change directions by rotation of the connection mechanism units 14A and 14B and the connection mechanism units 15A and 15B around Z axes, respectively. Therefore, it is possible to suppress shear rigidity of the actuators 14 and 15 while suppressing decrease in the generated force of the actuators 14 and 15. Further, when moving the driven body 11 in the ±Y axis direction, the actuators 12 and the actuator 13 change directions by rotation of the connection mechanism units 12A and 12B and the connection mechanism units 13A and 13B around Z axes, respectively. Therefore, it is possible to suppress shear rigidity of the actuators 12 and 13 while suppressing decrease in the generated force of the actuators 12 and 13.

MODIFICATION EXAMPLE

Modification Example 1

As illustrated in FIGS. 5A and 5B, the driving device 10 may include, instead of the connection mechanism unit 12B, a connection mechanism unit 12C having a columnar projection 23A provided on the second end member 23, and a columnar hole 16A provided in the support 16 in which the projection 23A is rotatably fitted. Similarly, the driving device 10 may include connection mechanism units having a configuration similar to that of the connection mechanism unit 12C described above, instead of the connection mechanism units 13B, 14B, and 15B. In the above-mentioned connection mechanism unit 12C or the like, since the second end portions of the actuators 12 to 15 and the support 16 are located at different heights, the second end portions of the actuators 12 to 15 can be suppressed from contacting the support 16 during driving. Note that the support 16 may be provided with the projection 23A, and the second end member 23 may be provided with the hole 16A.

Although not illustrated, the driving device 10 may include, instead of the connection mechanism units 12A, 13A, 14A, 15A, a connection mechanism unit having a columnar projection provided on the first end member 22 and a columnar hole provided in the driven body 11 in which the convex portion is rotatably fitted. In the connection mechanism unit described above, since the first end portions of the actuators 12 to 15 and the driven body 11 are located at different heights, the first end portions of the actuators 12 to 15 can be suppressed from contacting the driven body 11 during driving. Note that the driven body 11 may be provided with the projection, and the first end member 22 may be provided with the hole.

Modification Example 2

The driving device 10 may include, instead of the connection mechanism units 12A and 13A, a connection mechanism unit having one degree of rotational freedom that allows rotation around a Z axis, and one degree of translational freedom that allows translation in a direction (Y axis direction) along the first and second side portions of the driven body 11. Further, the driving device 10 may include, instead of the connection mechanism units 14A and 15A, a connection mechanism unit having one degree of rotational freedom that allows rotation around a Z axis, and one degree of translational freedom that allows translation in a direction (X axis direction) along the third and fourth side portions of the driven body 11. In a case where the driving device 10 includes the connection mechanism units described above instead of the connection mechanism units 12A, 13A, 14A, and 15A, it is possible to obtain the effect that shear rigidity can be suppressed while suppressing decrease in the generated force similarly to the first embodiment, even when the connection mechanism units 12B, 13B, 14B, and 15B are not included.

Figure 6:
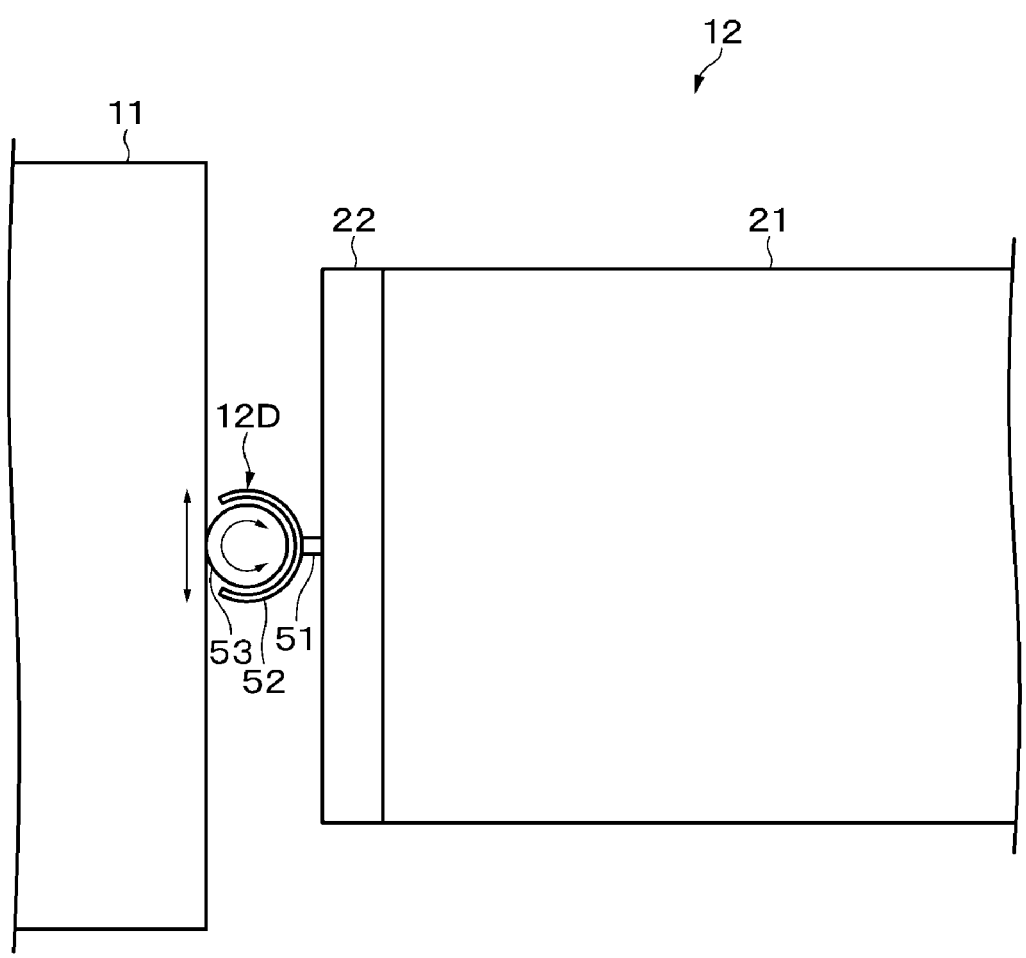
FIG. 6 is a plan view illustrating a modification example of the connection mechanism unit.

FIG. 6 illustrates a specific example of a configuration of the connection mechanism unit 12D having one degree of rotational freedom that allows rotation around a Z axis, and one degree of translational freedom that allows translation in the direction along the first and second side portions of the driven body 11. This connection mechanism unit 12D includes a shaft portion 51 provided at the first end portion of the actuator 12, a housing 52 supported by the shaft portion 51, and a columnar body 53 housed in the housing 52 rotatably around the Z axis. The columnar body 53 is coupled to the first side portion of the driven body 11 by magnetic force or the like so as to be translatable in the ±Y axis direction. Here, the configuration of the connection mechanism unit 12D provided between the first end portion of the actuator 12 and the first side portion of the driven body 11 has been described, but the other connection mechanism units can have a configuration similar to that of the connection mechanism unit 12D. Further, a sphere may be used instead of the columnar body 53.

Modification Example 3

Figure 7:
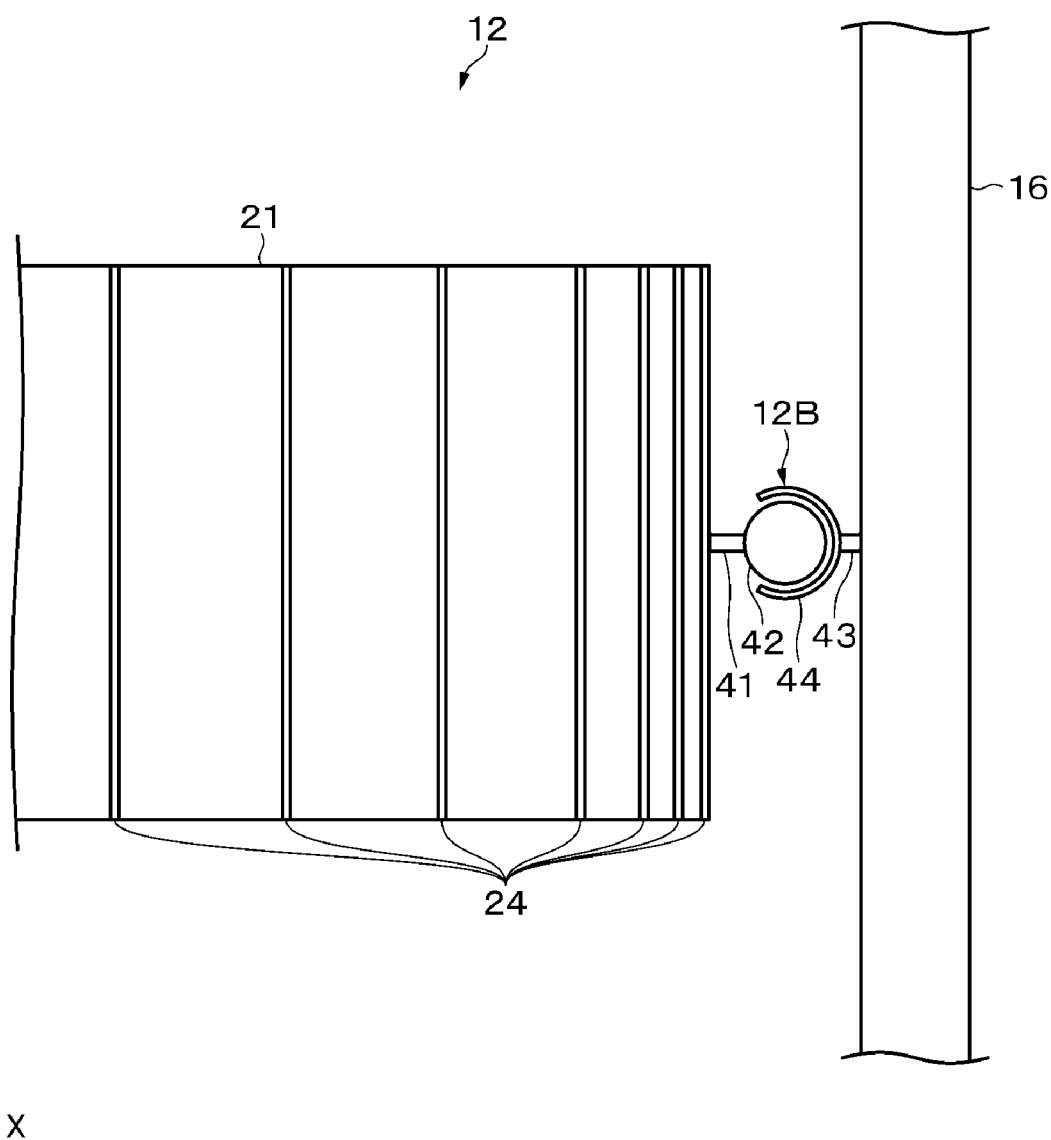
FIG. 7 is a plan view illustrating a modification example of the actuator.

As illustrated in FIG. 7, the actuator 12 may include a rectangular actuator body 21 having first and second end portions opposing each other, and a plurality of fibers 24 provided on a surface located between the first and second end portions in a surface of the actuator body 21. The plurality of fibers 24 is extended to be orthogonal to the X axis direction (direction from the first end portion toward the second end portion) and is provided to have density that increases from the center of the surface located between the first and second end portions toward the first and second end portions. As the fibers 24, for example, at least one of synthetic fiber or metal fiber can be used. As the synthetic fiber, for example, a polyamide-based synthetic fiber such as a nylon fiber, a carbon fiber, or the like can be used.

Although the configuration in which the actuator 12 includes the plurality of fibers 24 has been described here, similarly the actuators 13 to 15 may also include the plurality of fibers 24. However, in the actuators 14 and 15, the plurality of fibers 24 is extended to be orthogonal to the Y axis direction (direction from the first end portion toward the second end portion) and is provided to have density that increases from the center of the surface located between the first and second end portions toward the first and second end portions. Further, the plurality of fibers 24 may be provided inside the actuators 12 to 15.

Modification Example 4

The actuator body 21 may have a rigidity distribution in which rigidity increases from the center thereof toward the first end portion. In this case, the actuators 12 to 15 do not have to include the first end member 22. Similarly, the actuator body 21 may have a rigidity distribution in which the rigidity increases from the center thereof toward the second end portion. In this case, the actuators 12 to 15 do not have to include the second end member 23. Since the actuator body 21 has the above-mentioned rigidity distribution, even if the actuators 12 to 15 do not have the first end member 22 and the second end member 23, deformation of the first and second end portions can be suppressed. Therefore, the generated force can be improved.

The elastic moduli (Young's moduli) of the first and second end portions of the actuator body 21 having the above-mentioned rigidity distribution are preferably 10 MPa or more from the viewpoint of improving the generated force. Upper limit values of the elastic moduli of the first and second end portions of the actuator body 21 are not particularly limited, but are, for example, 1000 GPa or less. The elastic moduli mentioned above are values measured in accordance with JIS K 6251: 2010.

As a method of imparting the above rigidity distribution to the actuator body 21, for example, a method of imparting the above rigidity distribution to the dielectric elastomer layers 21A by forming the entire dielectric elastomer layers 21A with the same material and adjusting density or physical properties of the material, or a method of adding a material having higher rigidity than a base material to the dielectric elastomer layers 21A and giving this material a concentration distribution in which the rigidity increases from the center to the first and second end portions of the dielectric elastomer layers 21A, or the like can be mentioned, but it is not limited to these methods.

Modification Example 5

Figure 8:
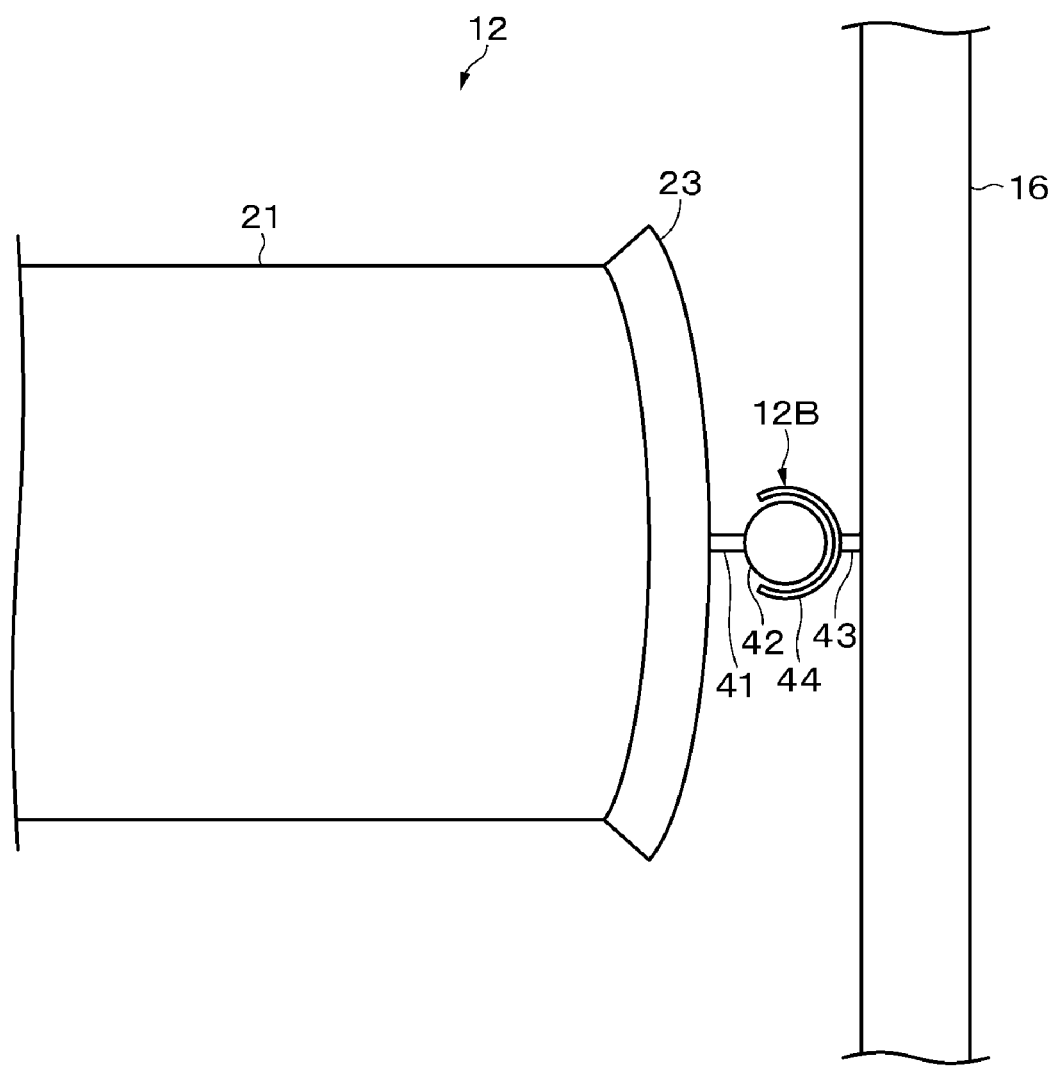
FIG. 8 is a plan view illustrating a modification example of the actuator.

As illustrated in FIG. 8, the second end portion of the actuator 12 may be curved in a convex shape. Similarly, the first end portion of the actuator 12 may be curved in a convex shape. By the first and second end portions curved in this manner, it is possible to prevent the first and second end portions of the actuator 12 from coming into contact with the first side portion and the first wall portion, respectively, when the actuator 12 becomes oblique with respect to the first side portion of the driven body 11 and the first wall portion of the support 16 at the time of driving. Here, although the configuration in which the first and second end portions of the actuator 12 are curved has been described, the first end portions of the actuators 13 to 15 may be curved, or the second end portions of the actuators 13 to 15 may be curved.

Modification Example 6

Figure 9:
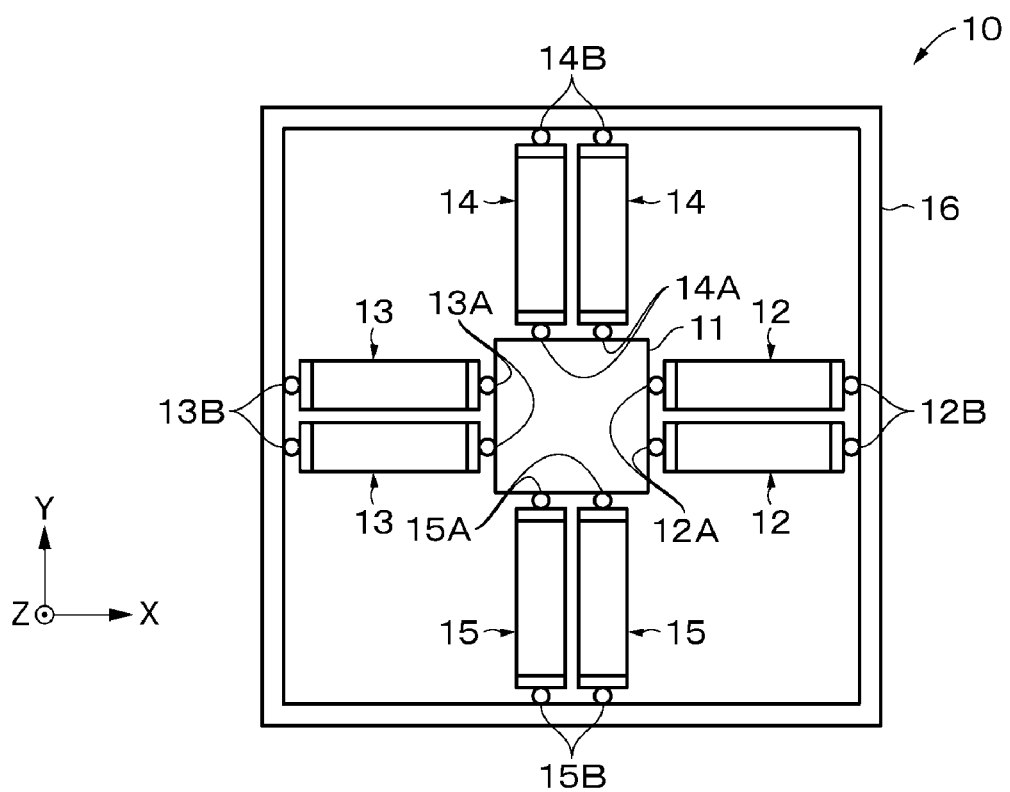
FIG. 9 is a plan view illustrating a modification example of the driving device.

The driving device 10 may include, as illustrated in FIG. 9, a plurality of actuators 12, a plurality of actuators 13, a plurality of actuators 14, and a plurality of actuators 15 between the first side portion of the driven body 11 and the first wall portion of the support 16, between the second side portion of the driven body 11 and the second wall portion of the support 16, between the third side portion of the driven body 11 and the third wall portion of the support 16, and between the fourth side portion of the driven body 11 and the fourth wall portion of the support 16, respectively.

Modification Example 7

Although the configuration in which the driving device 10 includes the four actuators 12 to 15 has been described in the first embodiment described above, the driving device 10 may include one of the two actuators 12 and 13 and one of the two actuators 14 and 15.

Modification Example 8

The connection mechanism units 12A, 12B, 13A, 13B, 14A, 14B, 15A, and 15B may have two or three degrees of rotational freedom. Specifically, a ball joint mechanism unit or the like may be mentioned as such a connection mechanism unit.

Modification Example 9

Although the configuration in which the actuator body 21 includes the plurality of dielectric elastomer layers 21A, the plurality of electrodes 21B, and the plurality of electrodes 21C has been described in the first embodiment described above, there may be employed a configuration including one dielectric elastomer layer 21A, one electrode 21B provided on a first surface of the dielectric elastomer layer 21A, and one electrode 21C provided on a second surface of the dielectric elastomer layer 21A. Further, although the case where the actuator body 21 has a rectangular shape has been described in the first embodiment described above, the shape of the actuator body 21 is not limited thereto, and for example, a polygonal shape, an oval shape (including an ellipse shape), a circular shape, or the like may be used. Further, the actuator body 21 may be wound in a columnar or cylindrical shape. Furthermore, the actuator body 21 may be a polymer actuator other than the DEA, or may be an actuator other than the polymer actuator.

Modification Example 10

Although the case where the driving device 10 is a shake correction device used in the imaging device has been described in the first embodiment described above, the present disclosure is applicable to a driving device used in various electronic devices other than the imaging device.

For example, it is applicable to a driving device used for a robot (multi-axis robot or the like), a drone, a personal computer, a mobile phone such as a smartphone, a television, a game device, a projection device for in-vehicle use, a wearable terminal such as a smart watch or a head mounted display, a medical device, or the like. Specifically, for example, it is applicable to a driving device used for a shake correction device of a smartphone or the like, a joint of a robot, a driving unit of a drone, an optical system of a projection device, or the like.

2 Second Embodiment

[Configuration of Driving Device]

FIG. 10A illustrates an example of the configuration of a driving device 110 according to a second embodiment of the present disclosure. The driving device 110 includes a driven body 111, actuators (first to third actuators) 112 to 114, a support 115, and connection mechanism units (first to third connection mechanism units) 112A, 113A, and 114A. The driving device 110 is a tri-axis driving device that can be driven to translate in the X axis direction and the Y axis direction and can be driven to rotate around a Z axis.

(Driven Body)

The driven body 111 has a triangular plate shape having first to third side portions.

(Support)

The support 115 supports the driven body 111 via the actuators 112 to 114. The support 115 is provided so as to oppose first to third sides of the driven body 111 and at a predetermined distance from the first to third sides of the driven body 111. The support 115 may be a part of a housing of an electronic device or the like in which the driving device 110 is provided.

(Actuators)

The actuators 112, 113, and 114 are extendable and contractible in first, second, and third directions, respectively. Here, the first, second, and third directions refer to directions orthogonal to or substantially orthogonal to the first, second, and third side portions of the driven body 111 in an initial state, respectively. The actuators 112 to 114 each include a rectangular film-shaped actuator body 121 having first and second end portions opposing each other, and a first end member 122 provided at the first end portion. The first end portions of the actuators 112, 113, and 114 are connected to the first, second, and third side portions of the driven body 111 via the connection mechanism units 112A, 113A, and 114A, respectively. On the other hand, each of the second end portions of the actuators 112, 113, and 114 is supported by the support 115.

The actuator body 121 and the first end member 122 are similar to the actuator body 21 and the first end member 22, respectively, in the first embodiment.

(Connection Mechanism Unit)

The connection mechanism unit 112A connects the first end member 122 of the actuator 112 and the first side portion of the driven body 111. The connection mechanism unit 113A connects the first end member 122 of the actuator 113 and the second side portion of the driven body 111. The connection mechanism unit 114A connects the first end member 122 of the actuator 114 and the third side portion of the driven body 111.

The connection mechanism units 112A, 113A, and 114A each have one degree of rotational freedom that allows rotation around a Z axis, and have one degree of translational freedom that allows translation along the first, second, and third side portions of the driven body 111.

FIG. 10B illustrates a specific example of a configuration of the connection mechanism unit 112A having one degree of rotational freedom that allows rotation around the Z axis and one degree of translational freedom that allows translation along the first side portion of the driven body 111. The connection mechanism unit 112A includes a shaft portion 151 provided at the first end portion of the actuator 112, a housing 152 supported by the shaft portion 151, and a columnar body 153 housed in the housing 152 rotatably around the Z axis. The columnar body 153 is coupled to the first side portion of the driven body 111 by magnetic force or the like so as to be translatable along the first side portion of the driven body 111. Although the configuration of the connection mechanism unit 112A has been described here, the other connection mechanism units 113A and 114A also have a configuration similar to that of the connection mechanism unit 112A.

[Operation of Driving Device]

Hereinafter, an example of operation of the driving device 110 when the driven body 111 is driven to rotate around the Z axis and operation of the driving device 110 when the driven body 111 is driven to translate in the X axis direction will be described with reference to FIGS. 11A and 11B. Note that in FIGS. 11A and 11B, the driven body 111 in an initial state (initial position) is illustrated by a chain double-dashed line. Further, arrows 111A, 111B, and 111C indicate directions of translational movement of the connection mechanism units 112A, 113A, and 114A, respectively, during rotational driving and translational driving of the driven body 111.

In the initial state, a specified voltage is applied to the actuators 112, 113, 114 by an actuator driving unit that is not illustrated, and the actuators 112, 113, 114 are extended to a specified length. Therefore, when a voltage higher than the specified voltage is applied to the actuators 112, 113, and 114 during the rotational driving or the translational driving of the driven body 111, the actuators 112, 113, and 114 are extended from the initial state and become longer than lengths in the initial state. On the other hand, when a voltage lower than the specified voltage is applied to the actuators 112, 113, and 114 during the rotational driving or the translational driving of the driven body 111, the actuators 112, 113, and 114 are contracted from the initial state and become shorter than the lengths in the initial state.

(Rotational Driving)

As illustrated in FIG. 11A, a voltage lower than the specified voltage is applied to the actuators 112 and 113 to contract the actuators 112 and 113, whereas the specified voltage is applied to the actuator 114 to retain the actuator 114 with the length in the initial state. Thus, the connection mechanism units 112A, 113A, and 114A are rotated and translated, and the driven body 111 is driven to rotate around the Z axis.

(Translational Driving)

As illustrated in FIG. 11B, a voltage higher than the specified voltage is applied to the actuator 114 to extend the actuator 114, and a voltage lower than the specified voltage is applied to the actuator 112 to contract the actuator 112, whereas the specified voltage is applied to the actuator 113 to retain the actuator 113 with the length in the initial state. Thus, the connection mechanism units 112A, 113A, 114A are translated and the driven body 111 is driven and to translate in the X axis direction.

[Effects]

The driving device 110 according to the second embodiment includes a driven body 111 having a triangular plate shape with first to third side portions, an actuator 112 that is extendable and contractible in a first direction that is orthogonal or substantially orthogonal to the first side portion, an actuator 113 that is extendable and contractible in a second direction that is orthogonal or substantially orthogonal to the second side portion, and an actuator 114 that is extendable and contractible in a third direction that is orthogonal to or substantially orthogonal to the third side portion. Moreover, the driving device 110 includes a connection mechanism unit 112A that connects the first end portion of the actuator 112 and the first side portion of the driven body 111, a connection mechanism unit 113A that connects the first end portion of the actuator 113 and the second side portion of the driven body 111, a connection mechanism unit 114A that connects the first end portion of the actuator 114 and the third side portion of the driven body 111, and a support 115 that supports each of the second end portions of the actuators 113 to 114. Thus, the driven body 111 can be driven to translate in the X axis direction and the Y axis direction, and can be driven to rotate around the Z axis.

Modification Example

The shapes of the driven bodies 11 and 111 are not limited to the rectangular plate shape and the triangular plate shape and may have a circular plate shape, an elliptical plate shape, a polygonal plate shape other than the rectangular plate shape and the triangular plate shape, an irregular plate shape, or the like, or may have a shape other than a plate shape, such as a spherical shape, an elliptical spherical shape, a polyhedral shape, a columnar shape, or a cylindrical shape.

3 Third Embodiment

[Configuration of Driving Device]

FIG. 12A illustrates an example of a configuration of a driving device 210 according to a third embodiment of the present disclosure. FIG. 13A illustrates an example of a configuration of a lower layer of the driving device 210. FIG. 13B illustrates an example of a configuration of a middle layer of the driving device 210. As illustrated in FIGS. 12A, 13A, and 13B, the driving device 210 includes a driven body 211, a set of actuators (first actuators) 212A and 212B, a set of actuators (second actuators) 214A and 214B, a set of actuators (third actuators) 216A and 216B, a connection mechanism unit (first connection mechanism unit) 213, a connection mechanism unit (second connection mechanism unit) 215, a connection mechanism unit (third connection mechanism unit) 217, and a support 218. The driving device 210 is a tri-axis driving device that can be driven to translate in the X axis direction and the Y axis direction and can be driven to rotate around a Z axis, more specifically, a tri-axis driving shake correction device used in an imaging device or the like.

The driving device 210 has a configuration in which the driven body 211 is arranged as an upper layer, the set of actuators 214A and 214B and the set of actuators 216A and 216B are arranged as a middle layer on a back surface side of the driven body 211, and the set of actuators 212A and 212B is arranged as a lower layer.

(Driven Body)

The driven body 211 is similar to the driven body 11 in the first embodiment.

(Support)

The support 218 supports a set of actuators 212A and 212B, a set of actuators 214A and 214B, and a set of actuators 216A and 216B. The configuration of the support 218 is similar to that of the support 16 in the first embodiment.

(Actuators)

The set of actuators 212A and 212B is extendable and contractible in the ±Y axis direction (the first direction). The set of actuators 214A and 214B and the set of actuators 216A and 216B are extendable and contractible in the ±X axis direction (the second direction orthogonal to the first direction).

The set of actuators 214A and 214B and the set of actuators 216A and 216B are provided on the set of actuators 212A and 212B. The driven body 211 is provided on the set of actuators 214A and 214B and the set of actuators 216A and 216B.

The actuators 212A and 212B, the actuators 214A and 214B, and the actuators 216A and 216B each include a rectangular film-like DEA having first and second end portions opposing each other. This DEA has a configuration similar to that of the actuator body 21 in the first embodiment.

The second end portions of the actuators 212A and 212B are supported by the third and fourth wall portions of the support 218, respectively, so that the first end portions of the actuators 212A and 212B oppose each other. The connection mechanism unit 213 is provided between the first end portions opposing each other of the actuators 212A and 212B.

The second end portions of the actuators 214A and 214B are supported by the first and second wall portions of the support 218, respectively, so that the first end portions of the actuators 214A and 214B oppose each other. The connection mechanism unit 215 is provided between the first end portions opposing each other of the actuators 214A and 214B.

The second end portions of the actuators 216A and 216B are supported by the first and second wall portions of the support 218, respectively, so that the first end portions of the actuators 216A and 216B oppose each other. The connection mechanism unit 217 is provided between the first end portions opposing each other of the actuators 216A and 216B. Further, a gap is provided between the actuators 214A and 214B and the actuators 216A and 216B.

(Connection Mechanism Unit)

The connection mechanism unit 213 connects the first end portions of the actuators 212A and 212B to each other, and also connects the first end portions of the actuators 212A and 212B and the back surface of the driven body 211. The connection mechanism unit 213 has a degree of translational freedom that allows translation in the X axis direction and a degree of rotational freedom that allows rotation around a Z axis. Specifically, as illustrated in FIG. 12B, the connection mechanism unit 213 is a mechanism unit in which a ball joint mechanism and a slide rail mechanism are integrated, and includes a pair of rails 213A and 213B and a ball part 213C.

The rails 213A and 213B are fixed to the first end portions of the actuators 212A and 212B, respectively. The rails 213A and 213B are provided parallel to each other and separated from each other. Further, the rail 213A has a groove portion $213A_1$ extending in a length direction of the rail 213A, and the rail 213B has a groove portion $213B_1$ extending in a length direction of the rail 213B. The groove portions $213A_1$ and $213B_1$ are provided at positions opposing each other. A cross-sectional shape of the groove portion $213A_1$ taken along a direction perpendicular to the length direction of the rail 213A and a cross-sectional shape of the groove portion 213B₁ taken along a direction perpendicular to the length direction of the rail 213B have an arc shape.

The ball part 213C is held between the rails 213A and 213B, specifically between the groove portions 213A₁ and 213B₁ so as to be translatable in the X a direction and rotatable around the Z axis. The ball part 213C has a shaft portion 213D that stands perpendicular to a surface and is rotatable around the Z axis. The shaft portion 213D supports a center of the back surface of the driven body 211 via the gap provided between the set of actuators 214A and 214B and the set of actuators 216A and 216B.

The connection mechanism unit 215 connects the first end portions of the actuators 214A and 214B to each other, and also connects the first end portions of the actuators 214A and 214B and the back surface of the driven body 211. The connection mechanism unit 215 has a degree of translational freedom that allows translation in the Y axis direction and a degree of rotational freedom that allows rotation around a Z axis. Specifically, the connection mechanism unit 215 is a mechanism unit in which a ball joint mechanism and a slide rail mechanism are integrated, and includes a pair of rails 215A and 215B and a ball part 215C. A configuration of the rails 215A and 215B and the ball part 215C is similar to that of the rails 213A and 213B and the ball part 213C except that the ball part 215C is held between the rails 215A and 215B so as to be translatable in the Y axis direction and rotatable around the Z axis, and that the shaft portion (not illustrated) of the ball part 215C supports a position shifted from the center of the back surface of the driven body 211 toward the third side portion.

The connection mechanism unit 217 connects the first end portions of the actuators 216A and 216B to each other, and also connects the first end portions of the actuators 216A and 216B and the back surface of the driven body 211. The connection mechanism unit 217 has a degree of translational freedom that allows translation in the Y axis direction and a degree of rotational freedom that allows rotation around a Z axis. Specifically, the connection mechanism unit 217 is a mechanism unit in which a ball joint mechanism and a slide rail mechanism are integrated, and includes a pair of rails 217A and 217B and a ball part 217C. A configuration of the rails 217A and 217B and the ball part 217C is similar to that of the rails 215A and 215B and the ball part 215C except that the shaft portion (not illustrated) of the ball part 217C supports a position shifted from the center of the back surface of the driven body 211 toward the fourth side portion.

A support position of the back surface of the driven body 211 by the connection mechanism unit 213 is in a center of the support position of the back surface of the driven body 211 by the connection mechanism unit 215 and the support position of the back surface of the driven body 211 by the connection mechanism unit 217.

It is preferable that the rails 213A and 213B have higher elastic moduli than the actuators 212A and 212B, respectively. Thus, deformation of the first end portions of the actuators 212A and 212B can be suppressed when the driving device 210 is driven. Therefore, the generated force can be improved. It is preferable that the rails 215A and 215B also have higher elastic moduli than the actuators 214A and 214B, respectively. Further, it is preferable that the rails 217A and 217B also have higher elastic moduli than the actuators 216A and 216B, respectively.

The elastic moduli (Young's moduli) of the rails 213A, 213B, 215A, 215B, 217A, and 217B are preferably 10 MPa or more from the viewpoint of improving the generated force. Upper limit values of the elastic moduli of the rails 213A, 213B, 215A, 215B, 217A, and 217B are not particularly limited, but are, for example, 1000 GPa or less. The rails 213A, 213B, 215A, 215B, 217A, and 217B include, for example, a polymeric resin, a metal, or both. The elastic moduli mentioned above are values measured in accordance with JIS K 6251: 2010. Note that the entire connection mechanism unit 213, the entire connection mechanism unit 215, and the entire connection mechanism unit 217 may have elastic moduli similar to those of the rails 213A and 213B, the rails 215A and 215B, and the rails 217A and 217B, respectively.

[Operation of Driving Device]

Hereinafter, an example of operation of the driving device 110 when the driven body 111 is driven to translate in the X axis direction or the Y axis direction and operation of the driving device 110 when the driven body 111 is driven to rotate around the Z axis will be described.

(Translational Driving in X Axis Direction)

Figure 14:
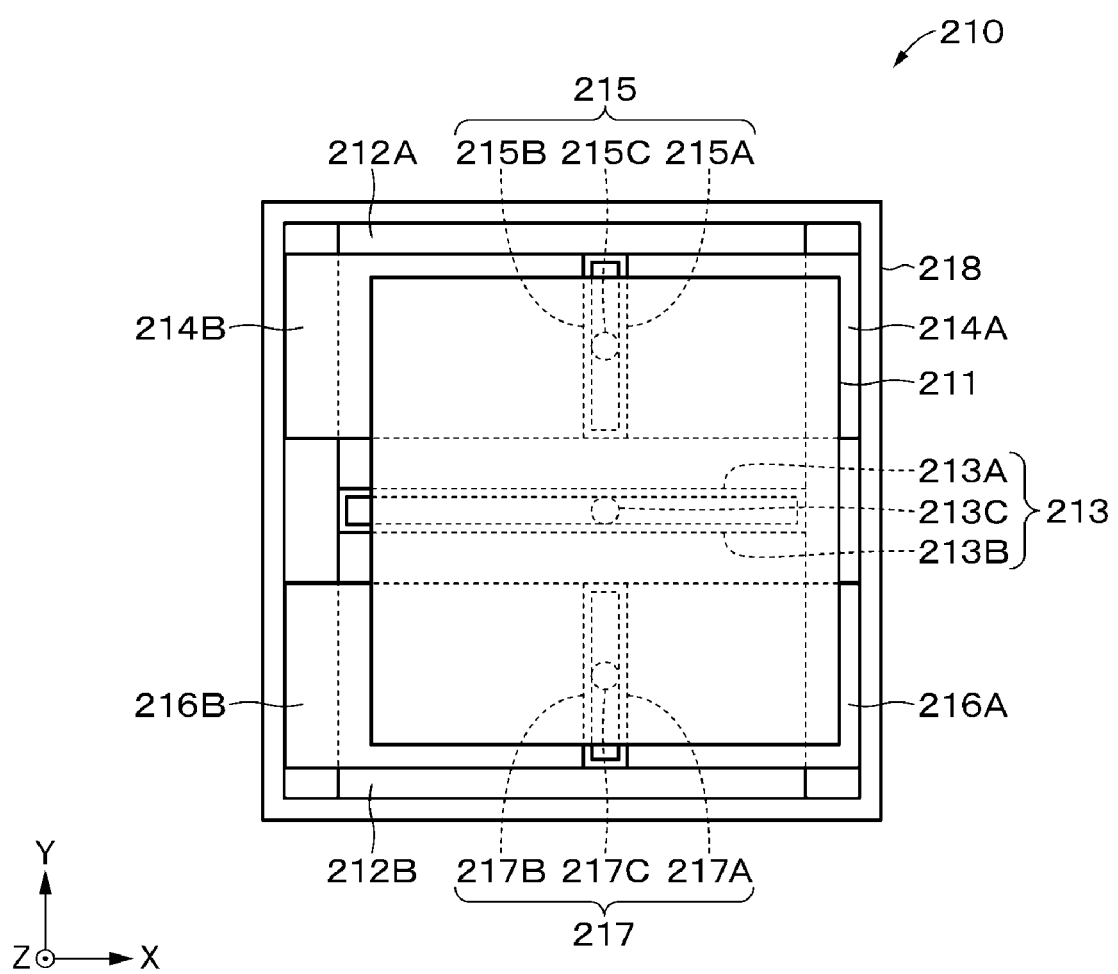
FIG. 14 is a schematic view for explaining an example of operation of the driving device during translational driving in an X axis direction.

When the driven body 211 is driven to translate in the X axis direction as illustrated in FIG. 14, each part of the driving device 210 is controlled as follows. That is, as illustrated in FIG. 15A, the actuators 212B and 212B are retained in an initial state without driving the actuators 212A and 212B. On the other hand, as illustrated in FIG. 15B, the actuators 214B and 216B are driven to extend the actuators 214B and 216B by the same length, whereas the actuators 214A and 216A are not driven and the actuators 214B and 216B are contracted accompanying the extension of the actuators 214B and 216B. Thus, the connection mechanism units 215 and 217 are driven to translate in the +X axis direction, and the driven body 211 is driven to translate in the +X axis direction.

(Translational Driving in Y Axis Direction)

Figure 16:
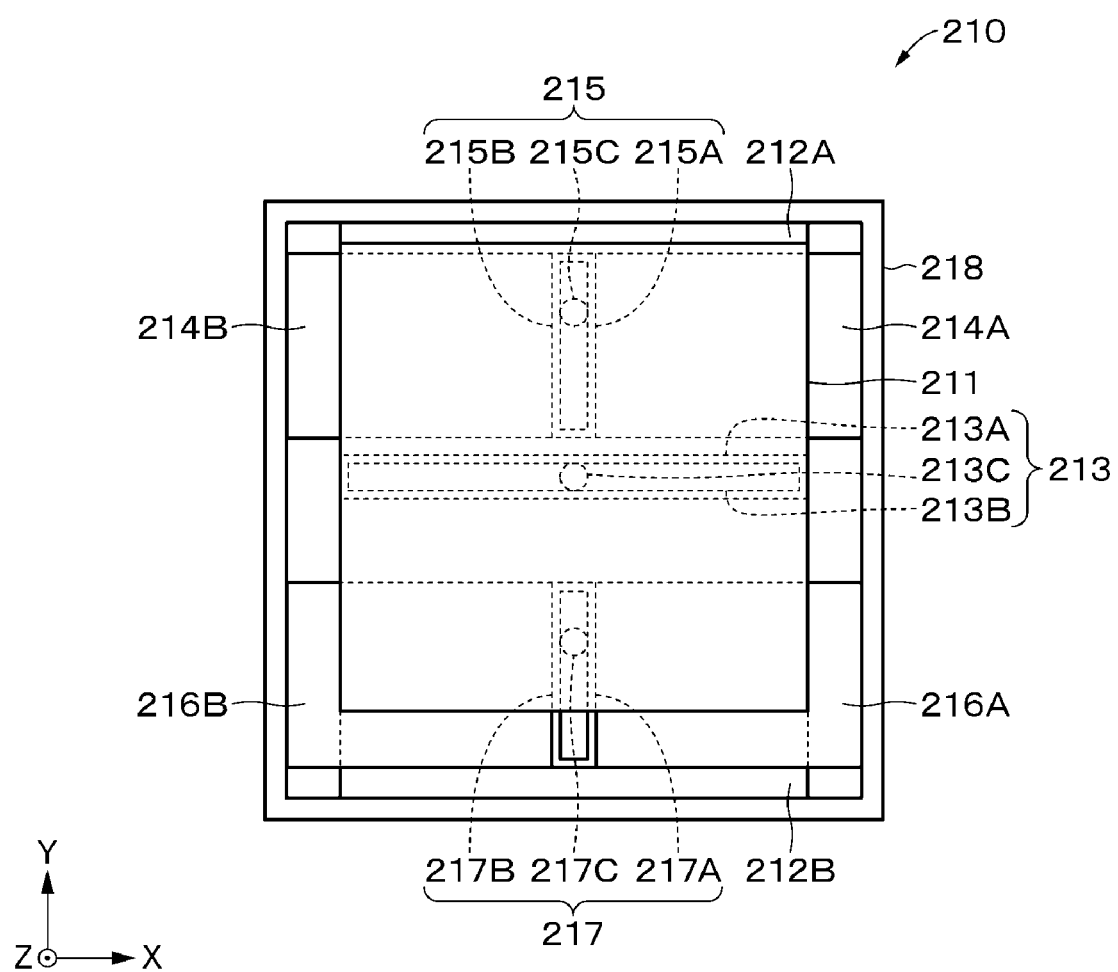
FIG. 16 is a schematic view for explaining an example of operation of the driving device during translational driving in a Y axis direction.

When the driven body 211 is driven to translate in the Y axis direction as illustrated in FIG. 16, each part of the driving device 210 is controlled as follows. That is, as illustrated in FIG. 17A, the actuator 212B is driven to extend the actuator 212B, whereas the actuator 212A is not driven and the actuator 212A is contracted as the actuator 212B is extended. On the other hand, as illustrated in FIG. 17B, the actuators 214A and 214B and the actuators 216A and 216B are retained in an initial state without driving the actuators 214A and 214B and the actuators 216A and 216B. Thus, the connection mechanism unit 213 is driven to translate in the +Y axis direction, and the driven body 211 is driven to translate in the +Y axis direction.

(Rotational Driving Around Z Axis)

Figure 18:
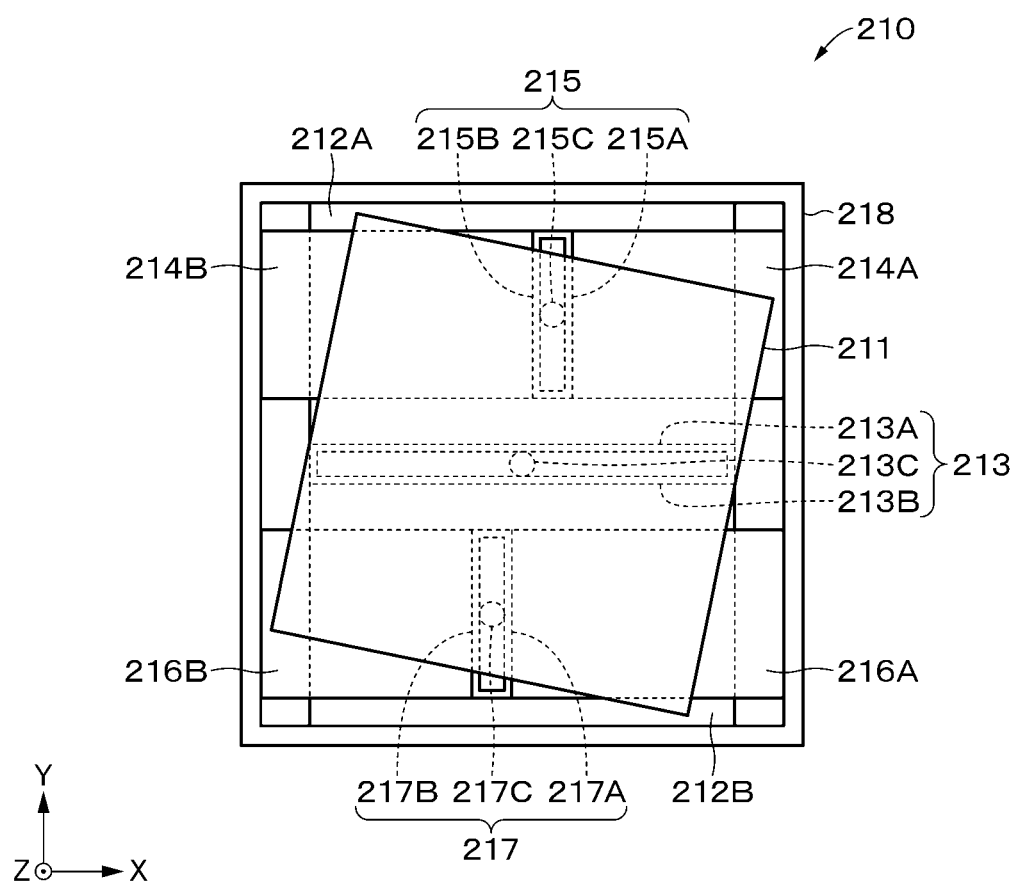
FIG. 18 is a schematic view for explaining an example of operation of the driving device during rotational driving.

When the driven body 211 is driven to rotate as illustrated in FIG. 18, each part of the driving device 210 is controlled as follows. That is, as illustrated in FIG. 19A, the actuators 212A and 212B are retained in an initial state without driving the actuators 212A and 212B. On the other hand, as illustrated in FIG. 19B, the actuators 214B and 216A are driven to extend the actuators 214B and 216A by the same length, whereas the actuators 214A and 216B are not driven and the actuators 214A and 216B are contracted by the extension of the actuators 214B and 216A. Thus, the connection mechanism units 215 and 217 are driven by same distances in the +X axis direction and the −X axis direction, respectively, and the driven body 211 is driven to rotate around the Z axis.

[Effects]

The driving device 210 according to the third embodiment has a configuration in which the set of actuators 214A and 214B and the set of actuators 216A and 216B are arranged as the middle layer on the back surface side of the driven body 211 as the upper layer, and further on the back side thereof, the actuators 212A and 212B are arranged as the lower layer. Therefore, in the driving device 210, the arrangement area can be reduced as compared with the driving device 110 according to the first embodiment, which has a configuration in which the actuators 12 to 15 are arranged around the driven body 11. Therefore, it is particularly effective to apply the driving device 210 to an electronic device such as an imaging device in which the arrangement area of the driving device is limited.

MODIFICATION EXAMPLE

Modification Example 1

In the third embodiment, the case where each of the connection mechanism units 213, 215, and 217 has a mechanism unit in which the ball joint mechanism and the slide rail mechanism are integrated has been described, but each of the connection mechanism units 213, 215, and 217 may have a mechanism unit in which the ball joint mechanism and the slide rail mechanism are separated.

Modification Example 2

The driving device 210 may include one of the actuators 212A and 212B. Further, either one of the actuators 214A and 214B may be included, or either one of the actuators 216A and 216B may be included.

Modification Example 3

In the initial state, a specified voltage may be applied to the actuators 212A, 212B, 214A, 214B, 216A, and 216B by the actuator driving unit that is not illustrated, and the actuators 212A, 212B, 214A, 214B, 216A, and 216B may be extended by a specified length. In this case, if a voltage higher than the specified voltage is applied to the actuators 212A, 212B, 214A, 214B, 216A, and 216B, the actuators 212A, 212B, 214A, 214B, 216A, and 216B are extended from the initial state and becomes longer than the length in the initial state. On the other hand, if a voltage lower than the specified voltage is applied to the actuators 212A, 212B, 214A, 214B, 216A, and 216B, the actuators 212A, 212B, 214A, 214B, 216A, and 216B are contracted from the initial state and becomes shorter than the length in the initial state.

4 Fourth Embodiment

[Configuration of Imaging Device]

Figure 20:
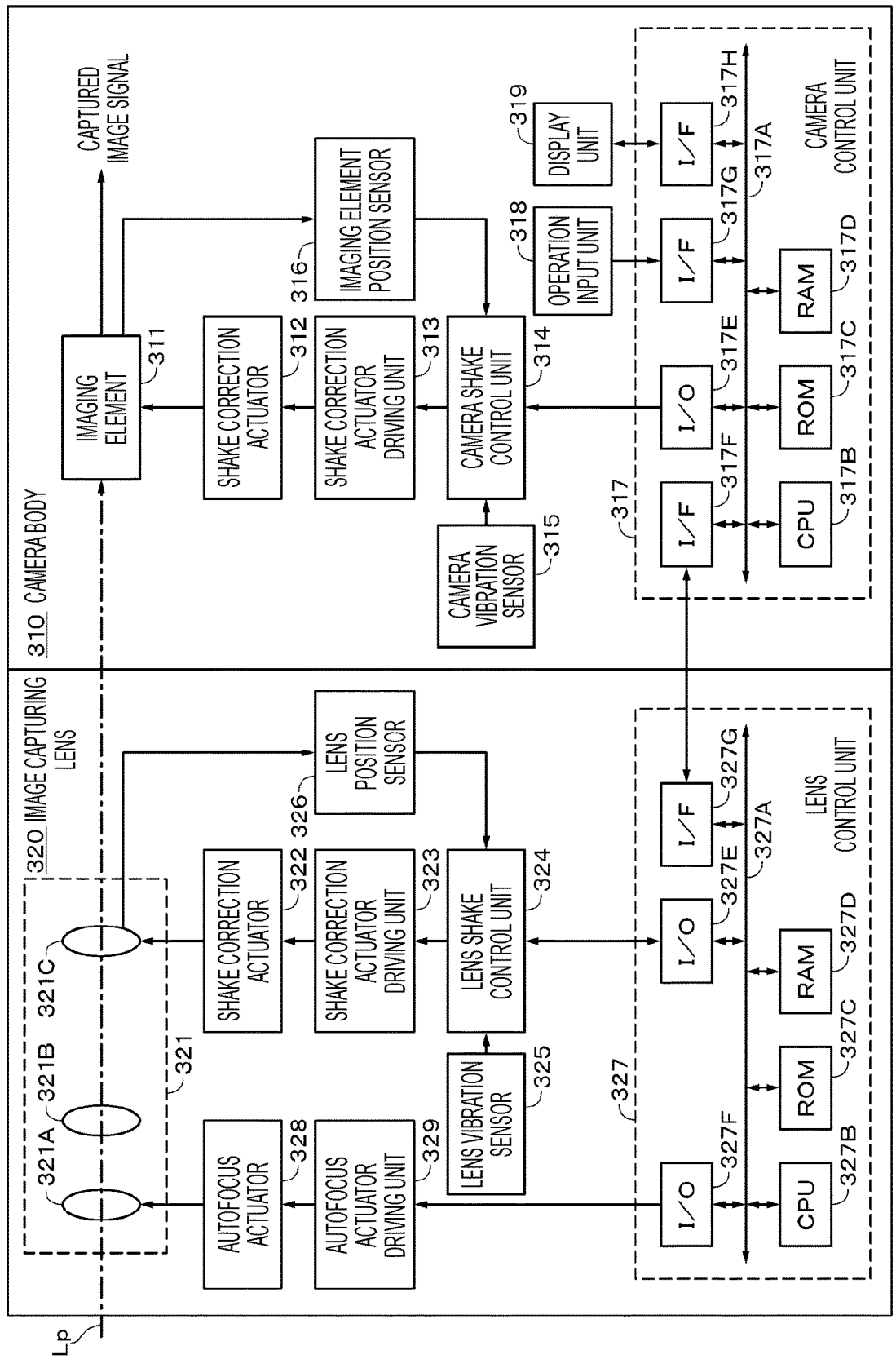
FIG. 20 is a block diagram illustrating an example of a configuration of an imaging device according to a fourth embodiment of the present disclosure.

FIG. 20 illustrates an example of a configuration of an image capturing device according to a fourth embodiment of the present disclosure. This image capturing device is what is called a single-lens reflex camera, and includes a camera body 310 and an image capturing lens 320 that is attachable to and detachable from the camera body. FIG. 20 illustrates a state in which the image capturing lens 320 is attached to the camera body 310 and the two are combined.

Although not illustrated, the camera body 310 and the image capturing lens 320 are provided with a mount portion, and the image capturing lens 320 is attachable to the mount portion. Then, in a state where the image capturing lens 320 is attached to the camera body 310, the mount portion is configured so that the two are optically coupled and also electrically coupled (connected).

Note that as is well known, the image capturing lens 320 can be replaced with a single focal length image capturing lens, a zoom lens, or the like that have a different focal length, instead of a single specific image capturing lens. These image capturing lenses 320 basically differ only in a configuration of a lens optical system as described later, and other components have similar configurations.

[Camera Body Configuration]

The camera body 310 includes an imaging element 311, a shake correction actuator 312, a shake correction actuator driving unit 313, an imaging element support (not illustrated), a camera shake control unit 314, a camera vibration sensor 315, an imaging element position sensor 316, a camera control unit 317, an operation input unit 318, a display unit 319, and the like.

The imaging element 311 photoelectrically converts a subject light image formed by incident light Lp through the image capturing lens 320 to generate a captured image signal. The imaging element 311 includes, for example, a CCD image sensor or a CMOS image sensor.

The captured image signal output from the imaging element 311 is subjected to image processing such as resolution conversion by an image processing unit, which is omitted in the illustration, and displayed on a monitor display (omitted in the illustration). Further, when the shutter button is pressed, the captured image signal is stored in a recording medium, which is omitted in the illustration, after compression processing and record encoding processing are performed.

The imaging element 311 constitutes a shake correction member (which may be simply referred to as a correction member in the following description) in a shake correction function on the camera body 310 side.

The shake correction actuator 312 is configured to drive movement of the imaging element 311 as a correction member on the camera body 310 side in a plane perpendicular to the optical axis of the incident light Lp. The shake correction actuator 312 includes a set of X-direction actuators that moves the imaging element 311 in a horizontal direction in a plane perpendicular to the optical axis of the incident light Lp, a set of Y-direction actuators that moves the imaging element 311 in a vertical direction in the plane perpendicular to the optical axis of the incident light Lp, a connection mechanism unit that connects an X-direction actuator and the imaging element 311, a connection mechanism unit that connects an X-direction actuator and the imaging element support, a connection mechanism unit that connects a Y-direction actuator and the imaging element 311, and a connection mechanism unit that connects a Y-direction actuator and the imaging element support.

The imaging element 311, the shake correction actuator 312, and the imaging element support form a shake correction device. Note that the driving device 10 according to the first embodiment is used as the shake correction device. Specifically, the actuators 12 and 13, the actuators 14 and 15, and the support 16 in the first embodiment are used as the set of X-direction actuators, the set of Y-direction actuators, and the imaging element support, respectively. Further, the connection mechanism units 12A, 12B, 13A, 13B, 14A, 14B, 15A, and 15B according to the first embodiment are used as the connection mechanism units.

The camera shake control unit 314 generates a control signal that controls driving of movement of the imaging element 311 that is the correction member of the camera body 310, and supplies the generated control signal to the shake correction actuator driving unit 313.

The shake correction actuator driving unit 313 generates a driving signal for driving the shake correction actuator 312 on the basis of the control signal from the camera shake control unit 314, and supplies the generated driving signal to the shake correction actuator 312.

The camera vibration sensor 315 detects vibration information (shake information) in the camera body 310, and supplies the detected vibration information to the camera shake control unit 314. The camera vibration sensor 315 includes an angular velocity sensor or an acceleration sensor (gyro sensor).

The imaging element position sensor 316 detects the position of the imaging element 311 in the plane perpendicular to the optical axis of the incident light Lp, and supplies the detected position information to the camera shake control unit 314. In this example, the imaging element position sensor 316 has a Hall sensor configuration using a Hall element.

The camera shake control unit 314 calculates a shake amount from the vibration information detected by the camera vibration sensor 315 and calculates a shake correction amount from the calculated shake amount and the position information from the imaging element position sensor 316. Then, the camera shake control unit 314 generates a control signal that controls driving of movement of the imaging element 311 that is the correction member from the calculated shake correction amount, and supplies the control signal to the shake correction actuator driving unit 313.

The camera shake control unit 314 controls whether or not to execute the shake correction by the control signal from the camera control unit 317. When the shake correction is not executed, the camera shake control unit 314 controls the position of the imaging element 311 in the plane perpendicular to the optical axis of the incident light Lp to be retained at a center position (centering position) of a movable range in this example.

The camera control unit 317 includes a microcomputer, to which an operation input unit 318 and a display unit 319 are connected. That is, a central processing unit (CPU) 317B, a read only memory (ROM) 317C, and a random access memory (RAM) 317D are connected to a system bus 317A in the camera control unit 317. Further, an I/O port 317E and interfaces (denoted as I/F in the diagram) 317F, 317G, and 317H are connected to the system bus 317A.

The ROM 317C stores various programs for control processing on the camera body 310 side. The CPU 317B uses the RAM 317D as a work area to execute the above-mentioned various types of control processing according to the programs stored in the ROM 317C.

The I/O port 317E is connected to the camera shake control unit 314. The camera control unit 317 supplies the camera shake control unit 314 with a control signal as to whether or not to execute shake correction through this I/O port 317E.

The interface 317F is for communicating with the control unit of the image capturing lens 320 (a lens control unit 327 as described later).

The interface 317G is an interface for the operation input unit 318. The operation input unit 318 includes a power switch, a shutter button, a selection button for image capturing mode, a menu button, and other operation buttons.

When the user operates any of the operation buttons of the operation input unit 318, an operation signal thereof is input to the system bus 317A through the interface 317G. The CPU 317B determines which operation button of the operation input unit 318 is operated from the operation signal, and executes necessary control processing according to the determination result.

The interface 317H has a function of a display controller and is an interface for the display unit 319. The display unit 319 includes, for example, a liquid crystal display or an electro luminescence (EL) display, and may also be used as a display for displaying a monitor image at a time of photographing. The camera control unit 317 generates display information according to a button operation input by the user through the operation input unit 318, and supplies the information to the display unit 319 through the interface 317H, so as to display the information on a display screen thereof

[Configuration of Image Capturing Lens]

The image capturing lens 320 includes a lens optical system 321, a shake correction actuator 322, a lens support (not illustrated), a shake correction actuator driving unit 323, a lens shake control unit 324, a lens vibration sensor 325, a lens position sensor 326, and a lens control unit 327. The image capturing lens 320 also includes an autofocus actuator 328, an autofocus actuator driving unit 329, and the like.

The lens optical system 321 includes a plurality of lenses 321A, 321B, and 321C, and a plurality of holders (support members), or the like that respectively support these lenses. The lens 321C is a shake correction lens, and constitutes the shake correction member in a shake correction function on the image capturing lens 320 side. The lens support supports the holder of the lens 321C via the shake correction actuator 322.

The shake correction actuator 322 moves the shake correction lens 321C in the plane perpendicular to the optical axis of the incident light Lp. The shake correction actuator 322 includes a set of X-direction actuators that moves the shake correction lens 321C in the horizontal direction in a plane perpendicular to the optical axis of the incident light Lp, a set of Y-direction actuators that moves the shake correction lens 321C in the vertical direction in the plane perpendicular to the optical axis of the incident light Lp, a connection mechanism unit that connects an X-direction actuator and the holder of the shake correction lens 321C, a connection mechanism unit that connects an X-direction actuator and the lens support, a connection mechanism unit that connects a Y-direction actuator and the holder of the shake correction lens 321C, and a connection mechanism unit that connects a Y-direction actuator and the lens support.

The correction lens 321C, the shake correction actuator 322, and the lens support form a shake correction device. Note that the driving device 10 according to the first embodiment is used as the shake correction device. Specifically, the actuators 12 and 13 and the actuators 14 and 15 in the first embodiment are used as the set of X-direction actuators and the set of Y-direction actuators, respectively. Further, the connection mechanism units 12A, 12B, 13A, 13B, 14A, 14B, 15A, and 15B according to the first embodiment are used as the connection mechanism units.

The lens shake control unit 324 generates a control signal that controls driving of movement of the shake correction lens 321C, and supplies the generated control signal to the shake correction actuator driving unit 323.

The shake correction actuator driving unit 323 generates a driving signal for driving the shake correction actuator 322 on the basis of the control signal from the lens shake control unit 324, and supplies the generated driving signal to the shake correction actuator 322.

The lens vibration sensor 325 detects vibration information (shake information) of the image capturing lens 320 and supplies the detected vibration information to the lens shake control unit 324. The lens vibration sensor 325 includes an angular velocity sensor or an acceleration sensor (gyro sensor).

The lens position sensor 326 detects the position of the lens 321C for vibration correction in the plane perpendicular to the optical axis of the incident light Lp, and supplies the detected position information to the lens shake control unit 324. In this example, the lens position sensor 326 has a Hall sensor configuration using a Hall element.

The lens shake control unit 324 calculates a shake amount from the vibration information detected by the lens vibration sensor 325 and calculates a shake correction amount from the calculated shake amount and the position information from the lens position sensor 326. Then, the lens shake control unit 324 generates a control signal that controls driving of movement of the shake correction lens 321C that is the correction member from the calculated shake correction amount, and supplies the control signal to the shake correction actuator driving unit 323.

The lens shake control unit 324 controls whether or not to execute the shake correction by the control signal from the lens control unit 327. When the shake correction is not executed, the lens shake control unit 324 controls the position of the shake correction lens in the plane perpendicular to the optical axis of the incident light Lp to be retained at the center position (centering position) of the movable range in this example.

The lens 321A of the lens optical system 321 is an autofocus lens.

The autofocus actuator 328 causes the autofocus lens 321A to move in the optical axis direction of the incident light Lp.

The autofocus actuator 328 includes, for example, a piezoelectric actuator. The autofocus actuator 328 is not limited to the piezoelectric actuator, and may include any one of an electromagnetic motor, an ultrasonic motor, a stepping motor, a DC motor, a polymer actuator, and a piezo motor.

The autofocus actuator driving unit 329 generates a driving signal for driving the autofocus actuator 328 on the basis of the control signal from the lens control unit 327, and supplies the generated driving signal to the autofocus actuator 328.

The lens control unit 327 includes a microcomputer. That is, a CPU 327B, a ROM 327C, and a RAM 327D are connected to the system bus 327A in the lens control unit 327. Further, I/O ports 327E and 327F and an interface 327G are connected to the system bus 327A.

The ROM 327C stores various programs for control processing on the image capturing lens 320 side. The CPU 327B executes the above-mentioned various types of control processing using the RAM 327D as a work area according to the programs stored in the ROM 327C.

The I/O port 327E is connected to the lens shake control unit 324. The lens control unit 327 supplies the lens shake control unit 324 with a control signal as to whether or not to execute shake correction through this I/O port 327E.

Further, the I/O port 327F is connected to the autofocus actuator driving unit 329. Although details are omitted, the lens control unit 327 generates a control signal for autofocus using a well-known method and supplies the control signal to the autofocus actuator driving unit 329 through the I/O port 327F.

The interface 327G is for communicating with the camera control unit 317 of the camera body 310.

[Shake Correction Operation on Camera Body Side]

Before starting a shake correction operation, the camera control unit 317 instructs the camera shake control unit 314 to cause movement (centering movement) of the imaging element 311 from an arbitrary position to a center position of the movable range in the plane perpendicular to the optical axis of the incident light Lp.

Upon receiving this instruction, the camera shake control unit 314 supplies a control signal for causing centering movement to the shake correction actuator driving unit 313. The shake correction actuator driving unit 313 sends a driving signal according to the control signal to the shake correction actuator 312. The shake correction actuator 312 causes centering movement of the imaging element 311.

After the centering movement of the imaging element 311, the camera shake control unit 314 takes in a vibration detection signal from the camera vibration sensor 315 and detects a shake amount. In this example, angular velocity data is taken in from the camera vibration sensor 315 as a vibration detection signal, the taken angular velocity data is converted into a shake angle and magnitude of the shake, and a shake amount in the plane perpendicular to the optical axis of the incident light Lp of the imaging element 311 is calculated from the shake angle and the magnitude.

Next, the camera shake control unit 314 takes in a position signal of the imaging element 311, which has been subjected to the centering movement, in the plane perpendicular to the optical axis of the incident light Lp from the imaging element position sensor 316. Then, the camera shake control unit 314 calculates the shake correction amount corresponding to a correction movement amount of the imaging element 311 in the plane perpendicular to the optical axis of the incident light Lp from the calculated shake amount and the acquired position signal of the imaging element 311.

Then, the camera shake control unit 314 sends a control signal according to the calculated shake correction amount to the shake correction actuator driving unit 313. The shake correction actuator driving unit 313 drives the shake correction actuator 312 with a driving signal according to the control signal. Thus, the imaging element 311 is corrected and moved in the plane perpendicular to the optical axis of the incident light Lp, and the shake detected on the camera body 310 side is corrected.

[Shake Correction Operation on Image Capturing Lens Side]

Also on the image capturing lens 320 side, a shake correction processing operation is performed similarly to that on the camera body 310 side described above.

That is, before starting the shake correction operation, the lens control unit 327 instructs the lens shake control unit 324 to cause movement (centering movement) of the shake correction lens 321C from an arbitrary position to the center position of the movable range in the plane perpendicular to the optical axis of the incident light Lp.

Upon receiving this instruction, the lens shake control unit 324 supplies a control signal for causing centering movement to the shake correction actuator driving unit 323. The shake correction actuator driving unit 323 sends a driving signal according to the control signal to the shake correction actuator 322. The shake correction actuator 322 causes centering movement of the shake correction lens 321C.

In this manner, after the centering movement of the shake correction lens 321C, the lens shake control unit 324 takes in a vibration detection signal from the lens vibration sensor 325 and detects the shake amount. In this example, angular velocity data is taken in from the lens vibration sensor 325 as a vibration detection signal, the angular velocity data is converted into a shake angle and magnitude of the shake, and a shake amount in the plane perpendicular to the optical axis of the incident light Lp of the shake correction lens 321C is calculated from the shake angle and magnitude.

Next, the lens shake control unit 324 takes in a position signal of the shake correction lens, which has been subjected to the centering movement, in the plane perpendicular to the optical axis of the incident light Lp from the lens position sensor 326. Then, the lens shake control unit 324 calculates the shake correction amount corresponding to a correction movement amount of the shake correction lens 321C in the plane perpendicular to the optical axis of the incident light Lp from the calculated shake amount and the acquired position signal of the shake correction lens 321C.

Then, the lens shake control unit 324 sends a control signal according to the calculated shake correction amount to the shake correction actuator driving unit 323. The shake correction actuator driving unit 323 drives the shake correction actuator 322 with a driving signal according to the control signal. Thus, the shake correction lens 321C is corrected and moved in the plane perpendicular to the optical axis of the incident light Lp, and the shake detected on the image capturing lens 320 side is corrected.

Modification Example

As a hand-shake correction device, the driving device 10 according to the modification example of the first embodiment may be used, or the driving device 210 according to the third embodiment or the modification example thereof may be used.

Although the case where both the camera body 310 and the image capturing lens 320 have the shake correction device has been described in the third embodiment described above, either the camera body 310 or the image capturing lens 320 may include the shake correction device.

Test Example

Hereinafter, the present disclosure will be specifically described with reference to test examples, but the present disclosure is not limited only to these test examples.

Test Example 1

First, in Test Example 1, a dual-axis driving device 60 illustrated in FIG. 21A was used as a model (½ target model) for a finite element method (FEM) simulation. Note that in the model of Test Example 1, the same reference numerals are given to parts corresponding to the first embodiment.

The driving device 60 is different from the driving device 10 according to the first embodiment in the following points. That is, connection mechanism units 61 and 62 connect the first end portion of the actuator 14 and the third side portion of the driven body 11, and the second end portion of the actuator 14 and the support 16, respectively. The first end portion of the actuator 12 and the first side portion of the driven body 11 are directly connected, and the second end portion of the actuator 12 and the support 16 are directly connected. The first end portion of the actuator 13 and the second side portion of the driven body 11 are directly connected, and the second end portion of the actuator 13 and the support 16 are directly connected.

As illustrated in FIG. 21B, the connection mechanism unit 61 includes a connection part 61A provided at the first end portion of the actuator 14 and a columnar projection 61B provided at the third side portion of the driven body 11. The connection part 61A has a hole in which the projection 61B is rotatably fitted around a Z axis.

Similarly, the connection mechanism unit 62 includes a connection part 62A provided at the second end portion of the actuator 14, and a columnar projection 62B provided on the support 16. The connection part 62A has a hole through which the projection 62B is rotatably fitted.

Setting conditions for respective parts of the model of Test Example 1 will be described in detail below.

Actuator body 21: DEA (Young's modulus 0.8 MPa, Poisson's ratio 0.5)

First and second end members 22 and 23: SUS304

Driven body 11: dummy imager (SUS304), 40 mm square, 1 mm thick

Support 16: SUS304

Connection mechanism units 61 and 62: degree of rotational freedom around one axis (degree of rotational freedom around a Z axis), and coefficient of friction=0.35 (assuming a coefficient of friction between general copper materials)

In the model having the configuration described above, driving rigidity was analyzed from reaction force when the driven body 11 was moved by 1 mm in the +X axis direction as depicted by an arrow 11A. Note that at the time of driving, the actuator body 21 of the initial size (W=30 mm, L=5 mm, t=0.5 mm) was stretched 1.2 times.

Test Example 2

In the FEM simulation model, driving rigidity was analyzed similarly to Test Example 1 except that the connection mechanism units 61 and 62 have a degree of rotational freedom of one axis (degree of rotational freedom around the Z axis), and the coefficient of friction is 0.1 (assuming a coefficient of friction reduced with grease or the like).

Test Example 3

In the FEM simulation model, driving rigidity was analyzed similarly to Test Example 1 except that the connection mechanism units 61 and 62 have no degrees of rotational freedom.

Test Example 4

As a model for the FEM simulation, the driving rigidity was analyzed similarly to Test Example 1 except that a single-axis driving device not provided with the actuator 14 and the connection mechanism units 61 and 62 was used.

(Analysis Results)

Analysis results of Test Examples 1 to 4 will be described below.

Test Example 1 (connection mechanism units 61 and 62 with a degree of rotational freedom)

Coefficient of friction=0.35 (coefficient of friction between general steel materials)

Driving rigidity 2.502 N/mm (Extension and contraction rigidity of actuators 12 and 13+extension and contraction rigidity of actuator 14+friction of connection mechanism units 61 and 62)

Test Example 2 (connection mechanism units 61 and 62 with a degree of rotational freedom)

Friction coefficient=0.1 (value assuming friction suppressed with grease or the like)

Driving rigidity 2.482 N/mm (Extension and contraction rigidity of actuators 12 and 13+extension and contraction rigidity of actuator 14+friction of connection mechanism units 61 and 62)

Test Example 3 (connection mechanism units 61 and 62 with no degree of rotational freedom)

Driving rigidity 3.104 N/mm (Extension and contraction rigidity of actuators 12 and 13+extension and contraction rigidity of actuator 14+shear rigidity of actuator 14)

Test Example 4 (single-axis driving without actuator 14 and connection mechanism units 61 and 62)

Driving rigidity 2.284 N/mm (Only extension and contraction rigidity of actuators 12 and 13)

The following can be seen from the above analysis results.

In Test Examples 1 and 2 in which the connection mechanism units 61 and 62 have a degree of rotational freedom of one axis, the driving rigidity can be reduced as compared with Test Example 3 in which the connection mechanism units 61 and 62 have no degree of rotational freedom of one axis. In Test Example 2 in which the friction coefficient of the connection mechanism units 61 and 62 is 0.1, particularly the driving rigidity can be reduced, and a value close to the driving rigidity of Test Example 4 using the single-axis driving can be obtained.

Although the first to fourth embodiments of the present disclosure and modification examples thereof have been specifically described above, the present disclosure is not limited to the first to fourth embodiments described above and their modification examples, and various modifications based on the technical idea of the present disclosure are possible.

For example, the configurations, methods, steps, shapes, materials, numerical values, and the like given in the first to fourth embodiments described above and the modification examples thereof are merely examples, and different configurations, methods, steps, shapes, materials, numerical values, and the like may be used as necessary.

Further, the configurations, methods, steps, shapes, materials, numerical values, and the like of the first to fourth embodiments described above and the modification examples thereof can be combined with each other without departing from the gist of the present disclosure.

Further, the present disclosure can also employ the following configurations.

(1)

A shake correction device including:

a driven body;

a first actuator that is extendable and contractible in a first direction;

a second actuator that is extendable and contractible in a second direction;

a support that supports the driven body via the first actuator and the second actuator;

a first connection mechanism unit that connects at least either between the first actuator and the driven body or between the first actuator and the support; and a second connection mechanism unit that connects at least either between the second actuator and the driven body or between the second actuator and the support, in which the first connection mechanism unit and the second connection mechanism unit have at least one degree of rotational freedom.

(2)

The shake correction device according to (1), in which the first actuator and the second actuator are dielectric elastomer actuators.

(3)

The shake correction device according to (1) or (2), in which the first actuator has a first end portion that is connected to the first connection mechanism unit, the second actuator has a second end portion that is connected to the second connection mechanism unit, and an elastic modulus of the first end portion and the second end portion is 10 megapascal (MPa) or more.

(4)

The shake correction device according to (1), in which each of the first actuator and the second actuator includes:

a dielectric elastomer actuator that has an end portion; and an end member that is provided at the end portion and has a higher elastic modulus than the dielectric elastomer actuator, and the end member of the first actuator and the end member of the second actuator are connected to the first connection mechanism unit and the second connection mechanism unit, respectively.

(5)

The shake correction device according to (4), in which the elastic modulus of the end member of the first actuator and the end member of the second actuator is 10 megapascal (MPa) or more.

(6)

The shake correction device according to any one of (1) to (5), in which the first connection mechanism unit connects the first actuator and the driven body, the second connection mechanism unit connects the second actuator and the driven body, and the first connection mechanism unit and the second connection mechanism unit further have at least one degree of translational freedom.

(7)

The shake correction device according to any one of (1) to (6), in which a space is provided between the driven body and the support, and the first actuator and the second actuator are arranged in the space.

(8)

The shake correction device according to any one of (1) to (7), in which the first actuator has a first end portion that is connected to the first connection mechanism unit, the second actuator has a second end portion that is connected to the second connection mechanism unit, and the first end portion and the second end portion are curved in a convex shape.

(9)

The shake correction device according to any one of (1) to (7), in which the first actuator has a first end portion that is connected to the first connection mechanism unit, the second actuator has a second end portion that is connected to the second connection mechanism unit, the first actuator has a plurality of first fibers that is provided to be orthogonal to the first direction and to have density that increases toward the first end portion, and the second actuator has a plurality of second fibers that is provided to be orthogonal to the second direction and to have density that increases toward the second end portion.

(10)

The shake correction device according to any one of (1) to (11), in which the driven body includes an imaging element or a lens.

(11)

A shake correction device including:

a first actuator that is extendable and contractible in a first direction;

a second actuator and a third actuator that are provided on the first actuator and are extendable and contractible in a second direction;

a driven body that is provided on the second actuator and the third actuator;

a support that supports the first actuator, the second actuator, and the third actuator;

a first connection mechanism unit that connects the first actuator and the driven body;

a second connection mechanism unit that connects the second actuator and the driven body; and a third connection mechanism unit that connects the third actuator and the driven body, in which the first connection mechanism unit has a degree of translational freedom that allows the driven body to move in the second direction, and a degree of rotational freedom that allows the driven body to rotate around an axis orthogonal to the first direction and the second direction, the second connection mechanism unit and the third connection mechanism unit have a degree of translational freedom that allows the driven body to move in the first direction and a degree of rotational freedom that allows the driven body to rotate around the axis, and the first connection mechanism unit is provided between the second connection mechanism unit and the third connection mechanism unit.

(12)

A driving device including:

a driven body;

a first actuator that is extendable and contractible in a first direction;

a second actuator that is extendable and contractible in a second direction;

a support that supports the driven body via the first actuator and the second actuator;

a first connection mechanism unit that connects at least either between the first actuator and the driven body or between the first actuator and the support; and a second connection mechanism unit that connects at least either between the second actuator and the driven body or between the second actuator and the support, in which the first connection mechanism unit and the second connection mechanism unit have at least one degree of rotational freedom.

(13)

A driving device including:

a first actuator that is extendable and contractible in a first direction;

a second actuator and a third actuator that are provided on the first actuator and are extendable and contractible in a second direction;

a driven body provided on the second actuator and the third actuator;

a support that supports the first actuator, the second actuator, and the third actuator;

a first connection mechanism unit that connects the first actuator and the driven body;

a second connection mechanism unit that connects the second actuator and the driven body; and a third connection mechanism unit that connects the third actuator and the driven body, in which the first connection mechanism unit has a degree of translational freedom that allows the driven body to move in the second direction, and a degree of rotational freedom that allows the driven body to rotate around an axis orthogonal to the first direction and the second direction, the second connection mechanism unit and the third connection mechanism unit have a degree of translational freedom that allows the driven body to move in the first direction and a degree of rotational freedom that allows the driven body to rotate around the axis, and the first connection mechanism unit is provided between the second connection mechanism unit and the third connection mechanism unit.

(14)

An imaging device including the shake correction device according to any one of (1) to (11).

(15)

An electronic device including the driving device according to (12) or (13).

REFERENCE SIGNS LIST 10, 110, 210 Driving device
11, 111, 211 Driven body
12, 13, 112, 212A, 212B Actuator (first actuator)
14, 15, 113, 214A, 214B Actuator (second actuator)
114, 216A, 216B Actuator (third actuator)
21, 121 Actuator body
22, 122 First end member
23 Second end portion end portion
24 Fiber
16, 115, 218 Support
12A, 13A, 14A, 15A, 112A, 213 Connection mechanism unit (first connection mechanism unit)
12B, 13B, 14B, 15B, 113A, 215 Connection mechanism unit (second connection mechanism unit)
114A, 217 Connection mechanism unit (third connection mechanism unit)
213A, 213B, 215A, 215B, 217A, 217B Rail
213C, 215C, 217C Ball part
$213A_1$, $213B_1$ Groove portion

The invention claimed is:

1. A shake correction device comprising:
a driven body;
a first actuator that is extendable and contractible in a first direction;
a second actuator that is extendable and contractible in a second direction;
a support that supports the driven body via the first actuator and the second actuator;
a first connection mechanism unit that connects at least either between the first actuator and the driven body or between the first actuator and the support; and
a second connection mechanism unit that connects at least either between the second actuator and the driven body or between the second actuator and the support,
wherein the first connection mechanism unit and the second connection mechanism unit have at least one degree of rotational freedom, and
wherein each of the first actuator and the second actuator includes:

a dielectric elastomer actuator that has an end portion; and
an end member that is provided at the end portion and has a higher elastic modulus than the dielectric elastomer actuator, and
the end member of the first actuator and the end member of the second actuator are connected to the first connection mechanism unit and the second connection mechanism unit, respectively.

2. The shake correction device according to claim 1, wherein the first actuator and the second actuator are dielectric elastomer actuators.

3. The shake correction device according to claim 1, wherein
the first actuator has a first end portion that is connected to the first connection mechanism unit,
the second actuator has a second end portion that is connected to the second connection mechanism unit, and
an elastic modulus of the first end portion and the second end portion is 10 megapascal (MPa) or more.

4. The shake correction device according to claim 1, wherein the elastic modulus of the end member of the first actuator and the end member of the second actuator is 10 megapascal (MPa) or more.

5. The shake correction device according to claim 1, wherein
the first connection mechanism unit connects the first actuator and the driven body,
the second connection mechanism unit connects the second actuator and the driven body, and
the first connection mechanism unit and the second connection mechanism unit further have at least one degree of translational freedom.

6. The shake correction device according to claim 1, wherein
a space is provided between the driven body and the support, and
the first actuator and the second actuator are arranged in the space.

7. The shake correction device according to claim 1, wherein
the first actuator has a first end portion that is connected to the first connection mechanism unit,
the second actuator has a second end portion that is connected to the second connection mechanism unit, and
the first end portion and the second end portion are curved in a convex shape.

8. The shake correction device according to claim 1, wherein
the first actuator has a first end portion that is connected to the first connection mechanism unit,
the second actuator has a second end portion that is connected to the second connection mechanism unit,
the first actuator has a plurality of first fibers that is provided to be orthogonal to the first direction and to have density that increases toward the first end portion, and
the second actuator has a plurality of second fibers that is provided to be orthogonal to the second direction and to have density that increases toward the second end portion.

9. The shake correction device according to claim 1, wherein the driven body includes an imaging element or a lens.

10. A shake correction device comprising:
a first actuator that is extendable and contractible in a first direction;
a second actuator and a third actuator that are provided on the first actuator and are extendable and contractible in a second direction;
a driven body that is provided on the second actuator and the third actuator;
a support that supports the first actuator, the second actuator, and the third actuator;
a first connection mechanism unit that connects the first actuator and the driven body;
a second connection mechanism unit that connects the second actuator and the driven body; and
a third connection mechanism unit that connects the third actuator and the driven body,
wherein the first connection mechanism unit has a degree of translational freedom that allows the driven body to move in the second direction, and a degree of rotational freedom that allows the driven body to rotate around an axis orthogonal to the first direction and the second direction,
the second connection mechanism unit and the third connection mechanism unit have a degree of translational freedom that allows the driven body to move in the first direction and a degree of rotational freedom that allows the driven body to rotate around the axis, and
the first connection mechanism unit is provided between the second connection mechanism unit and the third connection mechanism unit and
wherein each of the first actuator and the second actuator includes:
a dielectric elastomer actuator that has an end portion; and
an end member that is provided at the end portion and has a higher elastic modulus than the dielectric elastomer actuator, and
the end member of the first actuator and the end member of the second actuator are connected to the first connection mechanism unit and the second connection mechanism unit, respectively.

11. A driving device comprising:
a driven body;
a first actuator that is extendable and contractible in a first direction;
a second actuator that is extendable and contractible in a second direction;
a support that supports the driven body via the first actuator and the second actuator;
a first connection mechanism unit that connects at least either between the first actuator and the driven body or between the first actuator and the support; and
a second connection mechanism unit that connects at least either between the second actuator and the driven body or between the second actuator and the support,
wherein the first connection mechanism unit and the second connection mechanism unit have at least one degree of rotational freedom, and
wherein each of the first actuator and the second actuator includes:
a dielectric elastomer actuator that has an end portion; and
an end member that is provided at the end portion and has a higher elastic modulus than the dielectric elastomer actuator, and
the end member of the first actuator and the end member of the second actuator are connected to the first connection mechanism unit and the second connection mechanism unit, respectively.

12. A driving device comprising:
a first actuator that is extendable and contractible in a first direction;
a second actuator and a third actuator that are provided on the first actuator and are extendable and contractible in a second direction;
a driven body provided on the second actuator and the third actuator;
a support that supports the first actuator, the second actuator, and the third actuator;
a first connection mechanism unit that connects the first actuator and the driven body;
a second connection mechanism unit that connects the second actuator and the driven body; and
a third connection mechanism unit that connects the third actuator and the driven body,
wherein the first connection mechanism unit has a degree of translational freedom that allows the driven body to move in the second direction, and a degree of rotational freedom that allows the driven body to rotate around an axis orthogonal to the first direction and the second direction,
the second connection mechanism unit and the third connection mechanism unit have a degree of translational freedom that allows the driven body to move in the first direction and a degree of rotational freedom that allows the driven body to rotate around the axis, and
the first connection mechanism unit is provided between the second connection mechanism unit and the third connection mechanism unit, and
wherein each of the first actuator and the second actuator includes:
a dielectric elastomer actuator that has an end portion; and
an end member that is provided at the end portion and has a higher elastic modulus than the dielectric elastomer actuator, and
the end member of the first actuator and the end member of the second actuator are connected to the first connection mechanism unit and the second connection mechanism unit, respectively.

13. An imaging device comprising the shake correction device according to claim 1.

14. An electronic device comprising the driving device according to claim 11.

15. An imaging device comprising the shake correction device according to claim 10.

16. An electronic device comprising the driving device according to claim 12.

* * * * *